United States Patent [19]

Young et al.

[11] 4,115,729

[45] Sep. 19, 1978

[54] MULTIPHASE TO SINGLE PHASE AND FREQUENCY CONVERTER SYSTEM

[75] Inventors: Thomas A. Young, Burton; Ronald J. Freimark, Chagrin Falls, both of Ohio

[73] Assignee: Tenna Power Corporation, Cleveland, Ohio

[21] Appl. No.: 726,791

[22] Filed: Sep. 27, 1976

Related U.S. Application Data

[63] Continuation-in-part of Ser. No. 542,949, Jan. 22, 1975, abandoned.

[51] Int. Cl.² .......................... H02M 5/38; F02B 63/04
[52] U.S. Cl. .................... 322/86; 307/10 R; 363/36; 363/37
[58] Field of Search ............... 307/10 R; 322/1, 7, 322/8, 29, 32, 36, 37, 60, 86; 363/1, 34, 36, 37

[56] References Cited

U.S. PATENT DOCUMENTS

| | | | |
|---|---|---|---|
| 1,947,238 | 2/1934 | Willis | 363/1 |
| 1,947,268 | 2/1934 | Laub | 363/9 |
| 2,415,708 | 2/1947 | Sciaky | 219/91 X |
| 2,911,581 | 11/1959 | Rockafellow | 363/36 |
| 3,109,976 | 11/1963 | Sichling | 363/37 |
| 3,247,444 | 4/1966 | Clarke et al. | 363/36 |
| 3,333,177 | 7/1967 | Sutton | 363/34 |
| 3,341,737 | 9/1967 | Rosa | 363/37 X |
| 3,568,041 | 3/1971 | Arakane | 322/60 X |
| 3,611,112 | 10/1971 | Lehinhoff | 322/60 X |
| 3,770,976 | 11/1973 | Stroud et al. | 307/10 R |

*Primary Examiner*—A. D. Pellinen

*Attorney, Agent, or Firm*—Watts, Hoffmann, Fisher & Heinke Co.

[57] ABSTRACT

A multiphase to single phase electrical energy converter wherein the frequency is converted from a relatively high frequency, in the order of 1,000 hertz, to a relatively low frequency, as for example, normal household frequency of 60 hertz. A three-phase alternator is driven by an internal combustion engine and in one form of the invention the output of the alternator is fed to a controllable, full-wave bridge circuit and finally to an inverter. The controllable bridge circuit is controlled by a resolver, the resolver, alternator rotor and internal combustion engine all operating at the same rotary speed. In the one form the resolver is utilized to control the conduction of a plurality of controlled semiconductor devices interconnected between the output windings of the alternator and the invertor to control the delivery of energy from the alternator to the inverter. In another form the controlled semiconductor devices are replaced by a modified resolver. In accomplishing the control, the controlled rectifiers or modified resolver are rendered conductive to provide an average current or power to the inverter which increases and decreases in a unipolar sinusoidal form at a frequency which is twice the desired output frequency. The bridge circuit then provides an output to an inverter device which is rotating at one-half the speed of the resolver, the inverter being utilized to invert every other cycle of the output from the resolver. Thus, the power from the inverter will take the form of an alternating sinusoid waveform insofar as the power output is concerned at 60 hertz.

61 Claims, 11 Drawing Figures

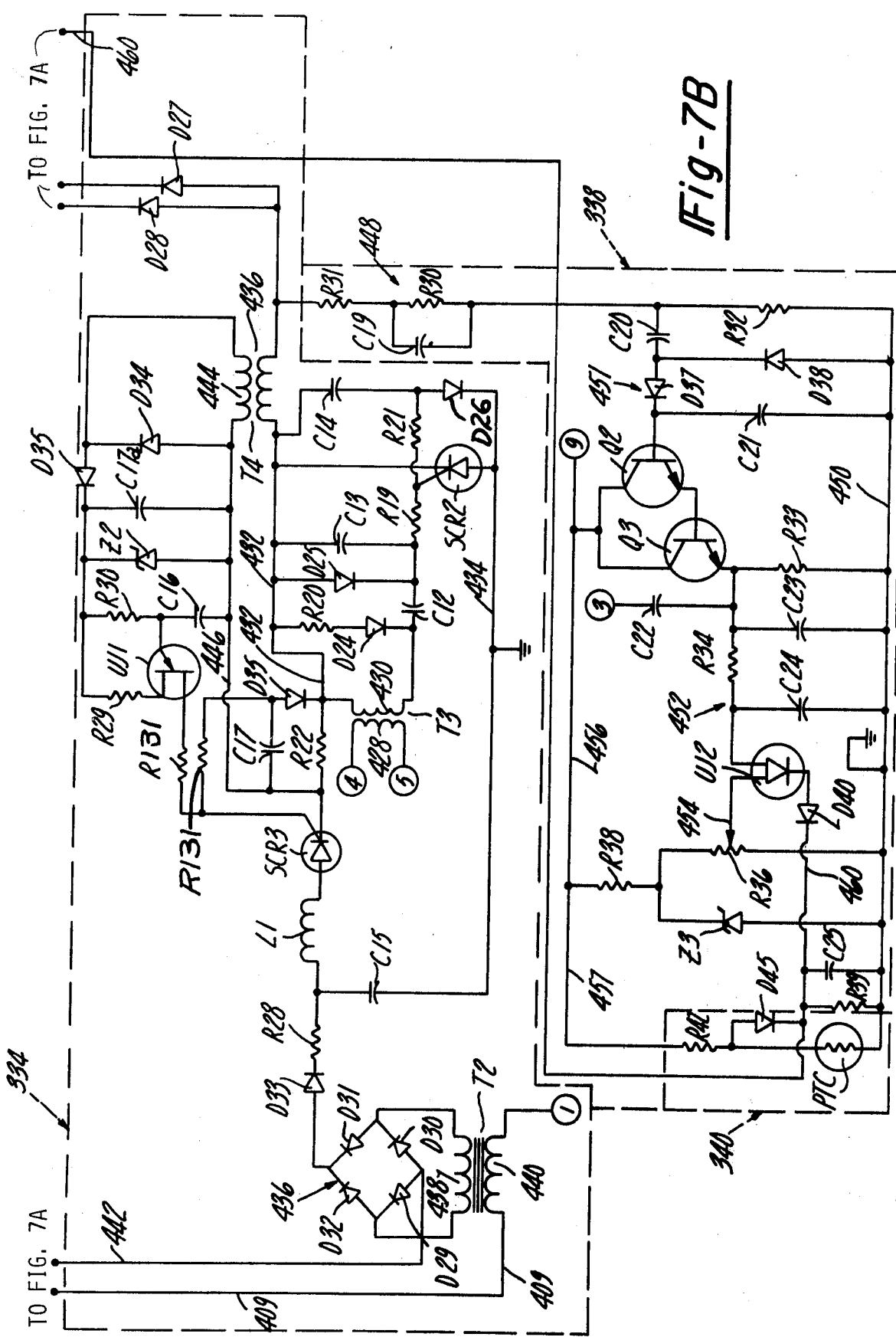

MULTIPHASE TO SINGLE PHASE AND FREQUENCY CONVERTER SYSTEM

REFERENCE TO COPENDING PATENT APPLICATION

The present invention is a continuation-in-part of the copending patent application Ser. No. 542,949 filed Jan. 22, 1975 (now abandoned).

BACKGROUND AND SUMMARY OF THE DEVELOPMENT

This invention relates generally to an energy conversion system and, more specifically, to an energy conversion system which is capable of converting three-phase high frequency energy to single phase, relatively low frequency energy as, for example, 60 cycle energy.

With the increased use of electrical energy in remote areas, a great demand has arisen for portable or emergency energy sources of electric power. Typically, these sources of electrical power are utilized to drive appliances and the like which are designed to efficiently operate at 60 hertz alternating power. Accordingly, there is a need for a portable source of alternating current, 60 hertz energy which is adapted to utilize the highly developed components readily available on the market.

As is well known, there is no readily available practical alternator system, in the conventional sense, with less than two poles. This limitation results in a maximum shaft speed of the 60 hertz alternating current generator of 3,600 rpm. This relatively slow shaft speed necessitates the use of heavy iron structures throughout the machine with subsequent high cost and lower overall efficiency. Further, there have become available highly developed alternators, for example, the alternators utilized in automotive use, and high horsepower-to-weight ratio prime, i.e., high shaft speed, movers which, with the features of the present invention, may be utilized to generage 60 cycle alternating current.

As stated above, the most common means of generating alternating current energy is by means of a generator driven by a prime mover. It is known that the size, and therefore the expense, of building a generator to produce a preselected power output decreases as the frequency increases. However, since the standard in the industry has become 60 hertz in the United States, and in many other countries of the world, the use of high frequency generators has not been practical for many applications.

This situation has been overcome with the system of the present invention which provides a means of utilizing a high frequency generator incorporating highly developed prime mover and generator components presently available on the market to produce a low frequency output.

This is accomplished by utilizing a conventionally available prime mover which is highly efficient, e.g., 7,200 rpm, to drive a high speed, three-phase, multipole, e.g. 12 to 16 poles, alternator of conventional design.

In a preferred form of the invention, the prime mover is operated at 7,200 rpm to rotate the field windings of a three-phase twelve pole alternator which is adapted to generate a 720 hertz output from a polyphase wye connected armature winding. The output of the three-phase armature winding is approximately equal to the desired peak voltage of the sinusoid waveform that the system reconstructs at the output. In the preferred form, this output voltage is approximately 160 volts. For purposes of this specification, the use of the term hertz is intended to include a repetitive waveform, whether alternating or unipolar.

The output of the three-phase 720 hertz alternator is fed to a full wave rectifier bridge, half of the rectifier bridge in one form of the invention being comprised of controlled rectifiers having a control electrode. The main current path of the output of the full wave bridge is fed to an inverter device which is utilized to invert alternate cycles of the output from the full wave bridge. The control electrode of the controlled rectifiers is connected to a resolver device which is utilized to control the firing of the controlled rectifiers in accordance with the synchronous operation of the prime mover. In a second form of the invention a modified resolver is used in place of the controlled rectifiers to control the rectification.

Accordingly, the switching of the power output of the controlled rectifiers or modified resolver is accomplished by the inverter device and occurs twice per output cycle. The inverter is devised and synchronized to perform its switching function at a point when the output voltage is zero. The inverter is not required to switch high currents with resistive loads; however where inductive loads are encountered an arc suppressor circuit can be provided.

As will be seen from a further description of the system, the output from the inverter is not, in the voltage sense, a sinusoidal waveform. Rather, the output is approximately at a constant voltage, for example 160 volts. However, the average output current generated at the output terminals of the inverter varies as a 60 hertz sinusoidal wave. This is accomplished by first switching to the conductive state the first switching device i.e. controlled rectifier or modified resolver to provide a short duration pulse of 160 volt peak amplitude. Subsequently, a second switching device is switched in to add to the output energy through the first switching device. In this situation, the average output current increases approximately by a factor of two from the original output pulses. Subsequently, the third switching device is switched in whereby all three switches and hence all phases are conducting and energy is flowing from the output inverter substantially continuously.

The situation then reverses whereby the first switching device is switched off and the second and third devices conduct to provide approximately two-thirds of the full load average current, and finally the second switching device is switched off leaving only the third switching device. At the end of the cycle, all three devices and hence phases are turned off and the inverter switches the subsequent waveform to the opposite polarity and presents this inverter waveform to the output of the inverter. From the foregoing, it is seen that each phase can provide approximately an equal amount of output current relative to the remaining phases. Thus, no one phase need provide substantially more energy than any other phase in the system. This operation becomes more apparent from a detailed study of FIGURE 2 to be described hereinafter.

Accordingly, it is one object of the present invention to provide an improved prime mover and generator set for generating alternating current low frequency energy.

It is another object of the present invention to provide an improved prime mover and generator set wherein the generator operates at a high frequency and the high frequency energy is converted to a relatively low frequency.

It is another object of the present invention to provide an improved prime mover and generator set wherein the output of the generator is converted to an average current having a waveform substantially sinusoidal in shape.

It is still another object of the present invention to provide an electrical energy conversion system wherein the generator portion of the system generates electrical energy at a relatively high frequency and this high frequency energy is converted to a low frequency, the low frequency being alternating in form and has a power envelope which is approximately equivalent to that of a sinusoidal waveform.

It is still a further object of the present invention to provide an improved energy conversion system which utilizes a multiphase, high frequency generator source for generating single phase, low frequency electrical energy.

It is still another object of the present invention to provide an improved energy conversion system which converts multiphase, high frequency energy to single phase, low frequency energy wherein the output voltage amplitude of the output energy is substantially constant.

It is another object of the present invention to provide an improved energy conversion system which converts multiphase, high frequency alternating current energy to single phase, low frequency alternating current energy wherein the power output of the system is a time modulated waveform having a sinusoidal characteristic.

It is a further object of the present invention to provide an improved energy conversion system which utilizes a high frequency multiphase electrical generator, the output of the generator being fed through controllable devices to control the feeding of the energy from the generator to the output in accordance with a desired average power output waveform.

It is a further object of the present invention to provide an improved electrical energy conversion system which utilizes a multiphase high frequency generator, the output thereof being fed to an output circuit wherein certain switching functions are performed within the system.

It is another object of the present invention to provide an improved prime mover generator set energy conversion system which obviates the use of large ferrous structures within the system while generating relatively low frequency output energy.

It is another object of the present invention to provide an improved prime mover and generator set having an extremely favorable frequency-to-weight power ratio.

It is still a further object of the present invention to provide an improved prime mover and generator set energy conversion system which is capable of utilizing high speed, light weight, automotive type alternators to produce the output energy.

It is still another object of the present invention to provide an improved prime mover and generator set energy conversion system for generating relatively low frequency output energy having a sinusoidal characteristic wherein the prime mover is operable at optimum shaft speeds above 3600 rpm.

It is another object of the present invention to provide an improved excitation circuit for a generator of the type described.

It is still another object of the present invention to provide an improved energy conversion system which is efficient and reliable in operation, inexpensive to manufacture, and highly portable.

Further objects, features and advantages of the present invention will become apparent from a detailed study of the specification and claims, and the attached drawings in which:

Figure 7A:
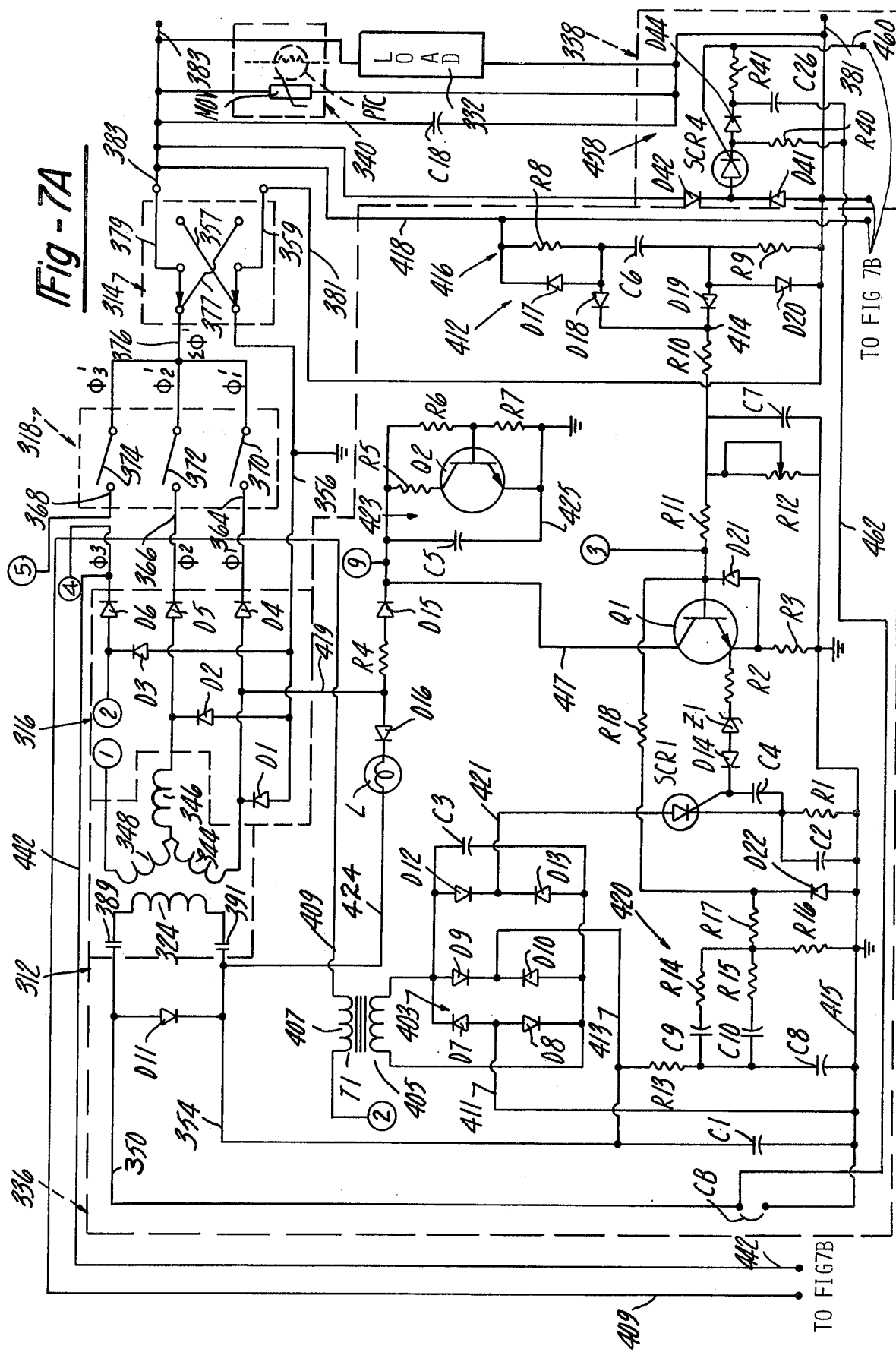
Figure 8:
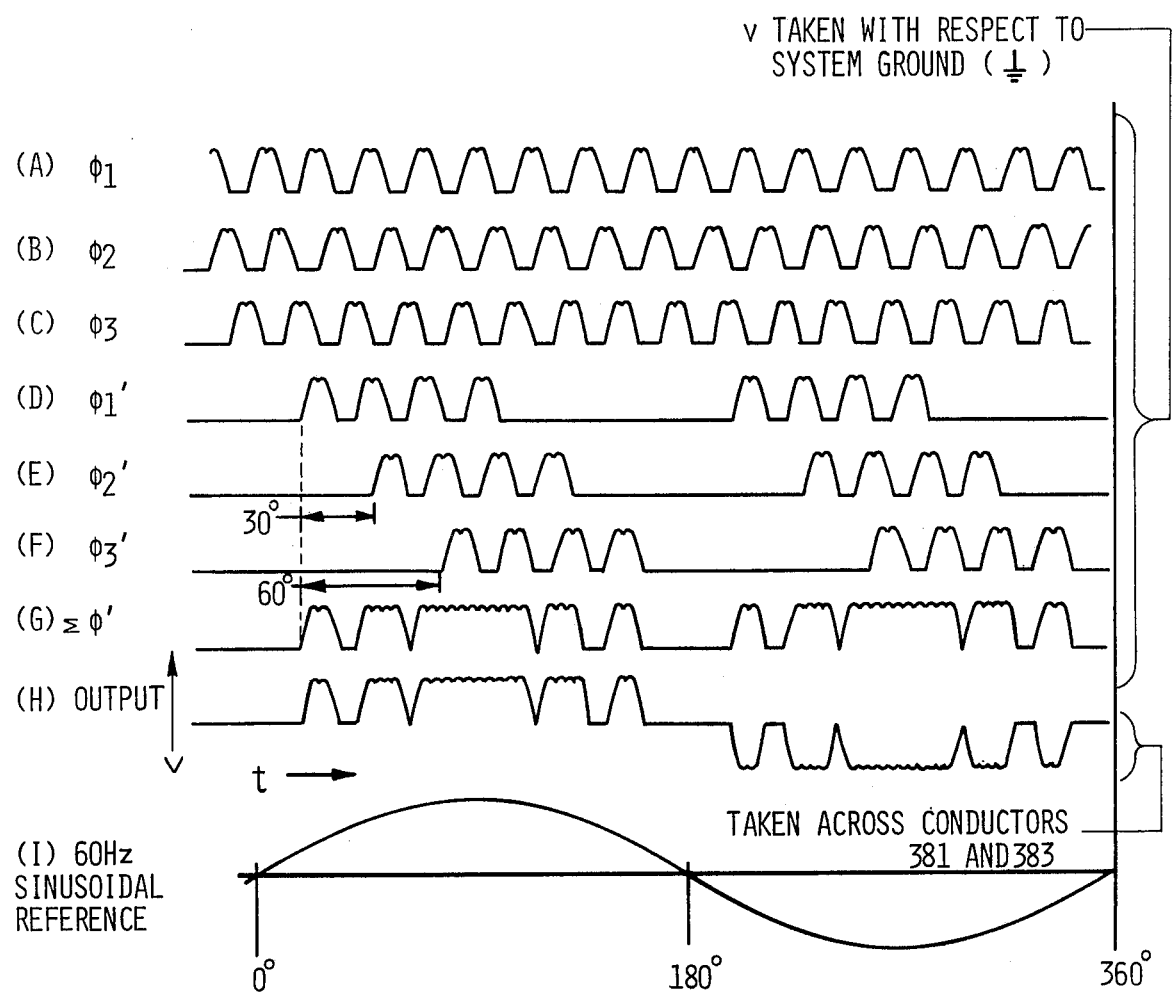

FIGS. 7A and B are electrical circuit diagrams of the electrical portions of the modified system;

FIG. 8 is a voltage versus time waveform diagram illustrating the relationship of the voltages generated, rectified, and resolved, and inverted.

Figure 6:
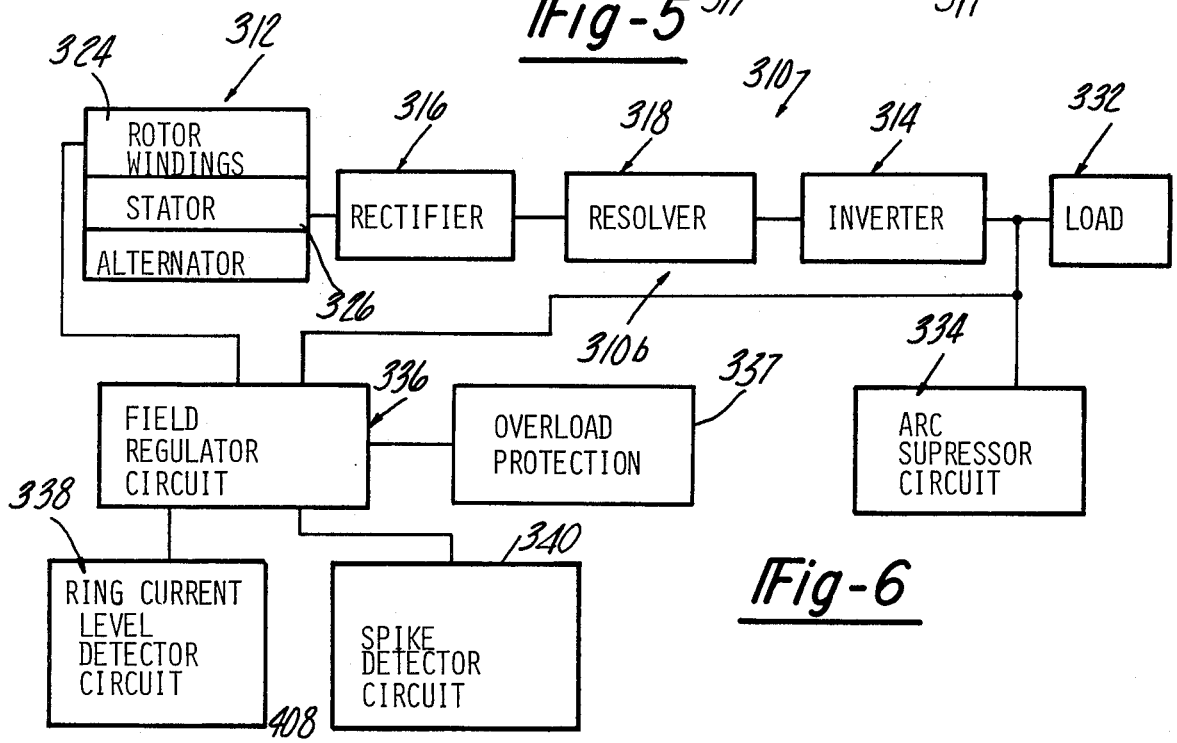
FIG. 6 is a block diagram illustrating the electrical portions of the modified system.
Figure 9:
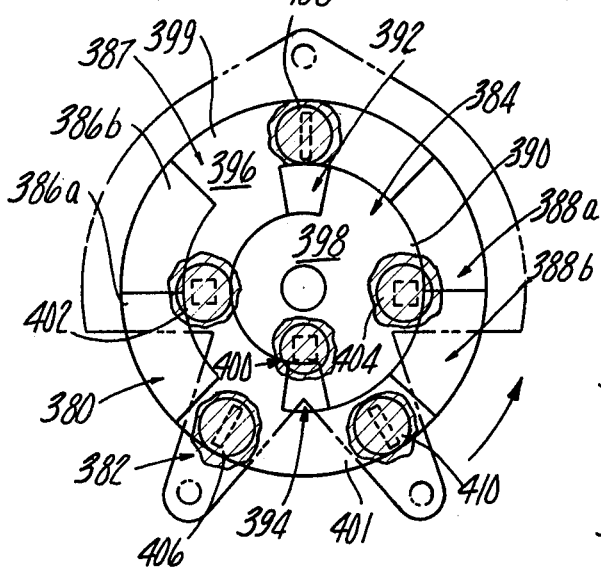
Figure 10:
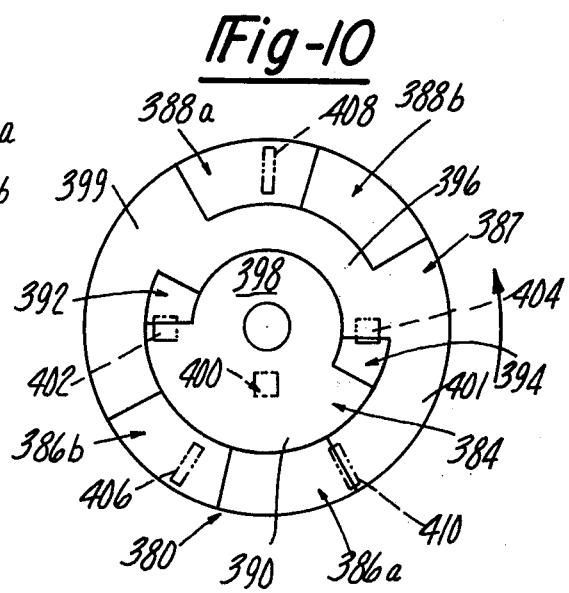

FIG. 9 is a plan view with some parts of the stator shown in phantom and others broken away of the combined resolver and inverter structures of the modified system; and FIG. 10 is a plan view with some parts removed of the combined resolver and inverter structures in a position at which actuation of the arc suppressor circuit of FIGS. 6 and 7A, B occurs.

Figure 1:
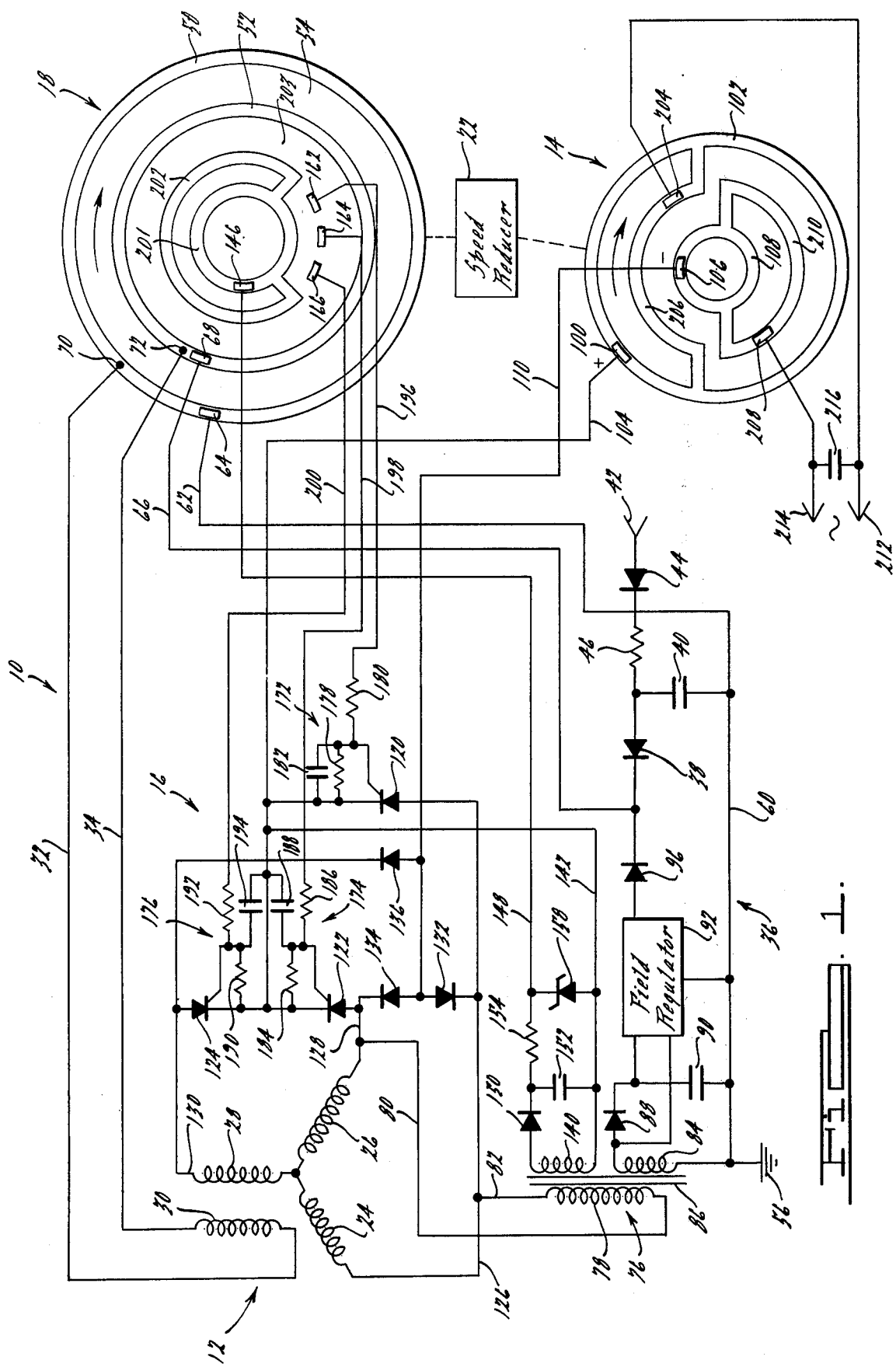
FIG. 1 is a schematic diagram illustrating the electrical and mechanical details of a preferred form of the present invention.

Referring now to the drawings, and particularly to the specific details illustrated in FIG. 1 thereof, an energy conversion system 10 is depicted which includes a high frequency multiphase alternating current generator 12, an output inverter 14 to which the output of the alternator is fed through a full wave bridge control circuit 16, the control circuit being controlled by means of a resolver unit 18.

The alternator 12 is a typical high frequency, multiphase alternator such as that utilized in conjunction with an automotive electrical generation system driven by the automobile engine. The alternator has been selected to be of the type which generates a three-phase, 720 hertz output power. The alternator 12 is adapted to be driven by a conventional internal combustion prime mover of the small horsepower type presently available on the market. The prime mover selected in the illustrated example, but not shown, is adapted to run at 7,200 rpm and has a power output commensurate with the energy which is desired to be generated by the electrical system and, for the most part, is in the five to ten horsepower range. Other prime movers could be used and run at different speeds with the desired speed of alternator 12 provided by a suitable gear drive or belt drive.

In one form, the prime mover shaft is directly coupled to the field windings 30 of the alternator 12 to rotate the field winding in synchronism with the prime mover speed, in the illustrated example 7,200 rpm. The shaft is also directly interconnected with the resolver 18 to drive the resolver 18 also at 7,200 rpm. The resolver, in turn, is interconnected with the inverter device 14 through a gear reducer 22 to drive the inverter 14 at one-half synchronous speed relative to the prime mover and the resolver 18. In view of the 7,200 rpm operating speed of the prime mover, the gear reducer has been selected to be a 2:1 gear reducer whereby the inverter 14 operates at 3,600 rpm. With the commercially available gear reducer selected, the output of the inverter will be a single phase output at a frequency of 60 hertz.

Referring to the specific details of the alternator, it is seen that the alternator includes a plurality of windings 24, 26, 28 which are interconnected in a wye configuration without a center tap. The windings 24, 26, 28 are wound on the stator poles in a conventional manner and are magnetically coupled to a field winding 30, the field winding 30 being wound on a conventional claw tooth type pole structure on the rotor. The field winding 30 is provided with exciting energy from an excitation circuit 36 by means of a pair of conductors 32, 34 and the resolver 18.

Referring to the specific details of the field excitation circuit 36, in the absence of a stored source of electrical energy, for example, a battery, there may be no electrical source of energy to excite the alternator 12. Accordingly, in order to initially provide an excitation source, a connection is provided to the engine ignition primary to provide pulses to a starting circuit which includes a diode 38 and a storage capacitor 40. The connection to the engine ignition primary is made by means of an input terminal 42, the pulses from the engine being fed to the storage capacitor 40 through a diode 44 and a resistor 46. These pulses are stored in the capacitor 40 until the voltage across the capacitor 40 rises to a level sufficient to forward bias the diode 38 to conduction. The diode 38 will remain forward biased until such time as the normal excitation circuit, to be described hereinafter, takes over in supplying current at which time the diode 38 will be back biased.

The energy being fed from capacitor 40 is fed to an outer and inner ring 50, 52 of the resolver 18, the rings being formed from conductive material and being electrically separated by insulating material 54. The outer ring is connected to ground potential at 56 by means of a conductor 60, a conductor 62 and a conducting brush 64. The conducting brush 64 is adapted to slide on the outer conductive ring 50. Similarly, the output of the diode 38 is fed to the inner ring 52 by means of a conductor 66 and a conducting brush 68, the conducting brush sliding on the inner ring 52. As was stated above, the resolver 18 rotates with the field winding 30. Thus, the conductors 32, 34 are solidly connected to the outer and inner rings 50, 52 respectively by means of connections 70, 72 respectively.

Upon initial rotation of the prime mover shaft, pulses of energy will be fed to the capacitor 40 from the engine ignition primary by means of terminal 42, diode 44 and a resistor 46. When the voltage on capacitor 40 reaches to a sufficient level to cause diode 38 to be forward biased, a relatively low voltage, current will flow through the diode 38 to the brush 68 and then through the conductor 34 to the upper end of winding 30. The return path for the lower end of winding 30 is provided by the conductor 32, the connection 70, the outer ring 50, the brush 64 and the conductor 62 to ground.

Once the field winding is excited and energy is being generated within the windings 24, 26, 28, self-excitation current is extracted from windings 24, 26 by means of a transformer 76, the primary winding 78 of which is connected across the ends of windings 24, 26 by means of a pair of conductors 80, 82. Thus, energy flows through the primary winding 78 to a secondary winding 84 which is magnetically coupled thereto through a core assembly 86.

The output of secondary winding 84 is rectified by means of a diode 88 and smoothed by means of a filter capacitor 90. This output from secondary winding 84 is then regulated by means of a field regulator circuit 92, the field regulator circuit 92 being any conventional regulator available for purposes of this type. For example, the field regulator 92 could be a standard series connected regulator which controls the output voltage at a constant level. Further, while the regulator circuit 92 is illustrated as being connected in the positive current circuit, it is to be understood that the regulator 92 may be connected in the ground conductor 60 to regulate that portion of the circuit.

The output of the regulator 92 is fed to the conductor 66 through a diode 96. The diode 96 is poled such that energy flowing from the capacitor 40 through the diode 38 will not flow to the field regulator 92. Further, the energy flowing from the field regulator 92 is sufficient to back-bias the diode 38. Thus, exciting energy is fed to the brush 68 through the conductor 66 to excite the field winding 30 as was the case when energy was being derived from the engine ignition primary connected to terminal 42.

As stated above, the output of the alternator is fed to the inverter device 14 through the control circuits 16. In the present configuration, the positive output of the alternator is fed to a positive brush 100 which slides on an outer ring 102 forming the positive input potential to the inverter device 14. This connection is made by means of a conductor 104. Similarly, the negative output from the alternator 12 is fed to a negative brush 106 which slides on a conductive ring 108, the brush 106 being connected to the alternator by means of a conductor 110. However, disregarding polarity, the energy being fed to the brushes 100, 106 is controlled by the control circuit 16 and generally takes the form illustrated in FIG. 3 to be described hereinafter.

Referring specifically to the control circuit 16, the control circuit 16 is majorly comprised of a full wave rectifier bridge, half of which is formed by a plurality of positive conducting controlled rectifiers 120, 122, 124 corresponding to windings 24, 26, 28, the three phases of the alternator 12. Specifically, the lower left end of winding 24 is connected to the anode of the controlled rectifier 120 by means of a conductor 126, the lower right end of the winding 26 is connected to the anode of controlled rectifier 122 by means of a conductor 128, and the upper end of winding 28 is connected to the anode of controlled rectifier 124 by means of a conductor 130. These controlled rectifiers 120, 122, and 124 from the positive current conducting paths for the alternator, the output of these controlled rectifiers 120, 122 and 124 being connected in parallel.

The negative current conducting paths for the windings 24, 26 and 28 are formed by diodes 132, 134 and 136 respectively. Specifically, all of the anodes of the diodes 132, 134 ad 136 are connected to the negative brush 106 by means of conductor 110 in a generally parallel configuration. The cathode of diode 132 is connected to the lower left end of winding 24, by means of the conductor 126, the cathode of diode 134 is connected to the lower right end of winding 26 by means of the conductor 128, and the cathode of diode 136 is connected to the upper end of winding 28 by means of the conductor 130. The negative paths have been provided by uncontrolled rectifying devices in the form of diodes 132, 134, 136. However, it is contemplated that a controlled rectifier may be provided in lieu of any one or more of the diodes 132, 134 and 136 to provide further control of the energy being supplied to the inverter 14.

From the foregoing, it is seen that the flow of current from the alternator 12 is controlled by a plurality of controlled rectifiers 120, 122 and 124. Obviously, the controlled rectifiers 120, 122 and 124 require a firing signal in order to initiate conduction of the control rectifiers 120, 122 and 124. In the absence of a firing signal, the controlled rectifiers 120, 122 and 124 will not conduct and no energy will be supplied to the inverter device 14.

This firing energy is derived from the transformer 76 and specifically from a secondary winding 140 which is magnetically coupled to the primary winding 78 through the core assembly 86. This energy is fed to the gate electrodes of the controlled rectifiers 120, 122, 124 through the resolver device 18, as will be more fully explained hereinafter. The firing signal being generated at the output of secondary winding 140 is referenced to the cathodes of the controlled rectifiers 120, 122 and 124, this being accomplished by means of a connection to all of the cathodes of the controlled rectifiers 120, 122, 124 through conductor 142. The positive portion of the output of secondary winding 140 is fed to the resolver 18, and specifically to a brush 146 thereof by means of a conductor 148.

The output of the secondary winding 140 is rectified by means of a diode 150 and filtered by means of a filter capacitor 152. The current to the gate electrodes is limited by means of a resistor 154 and the peak voltage being fed to the conductor 148 is being clamped to an upper positive level by means of a Zener diode 158. Thus, if the voltage on conductor 148 exceeds the avalanche voltage of the Zener diode 158, the diode 158 will avalanche and conduct in the opposite direction to limit the voltage on conductor 148 to the avalanche level.

Referring now to the details of the portion of the resolver 18 which controls the firing of the controlled rectifiers 120, 122 and 124, it is seen that the gate electrodes of the controlled rectifiers 120, 122 and 124 are connected to a plurality of brushes 162, 164 and 166, respectively, through networks 172, 174 and 176. Referring specifically to network 172, the network 172 includes a gate-to-cathode resistor 178, a current limiting resistor 180 and a noise suppression capacitor 182, this latter capacitor eliminating any noise from the gate electrode to insure that spurious noise does not trigger controlled rectifier 120. A similar situation exists with network 174 which includes a gate-to-cathode resistor 184, a current limit resistor 186 and a noise suppression capacitor 188. The same is true for network 178 which includes a gate-to-cathode resistor 190, current limit resistor 192 and a noise suppression capacitor 194. Each of the networks 172, 174 and 176 are connected to the respective brushes 162, 164 and 166 by means of conductors 196, 198 and 200 respectively.

As stated above, the firing energy for firing the gate electrodes is derived from the secondary winding 140 and fed to the brush 146. This brush rides on a continuous ring 201 of conductive material to constantly make energy available at the conductive ring 201. The brushes 162, 164 and 166 are fixedly mounted, as are all of the brushes illustrated in FIG. 1, to slide in a ring which includes a conductive segment 202, the segment 202 being electrically isolated from the ring 52 by non-conductive material 203.

Thus, with the resolver 18 rotating in a clockwise direction, the leading edge of the conductive segment 202 will engage the brush 162 to connect the brush 162 to the brush 146 and provide firing energy to the first controlled rectifier 120 associated with the winding 24. Thus, current may flow from the winding 24 through the controlled rectifier to the positive output brush 100 through the conductor 104. Subsequently, the leading edge of conductive segment 202 engages brush 164 to provide firing energy to the controlled rectifier 122 to permit positive current to flow from the winding 26 through the controlled rectifier 122, through conductor 104, to the brush 100. Finally, the leading edge of conductive segment 202 engages brush 166 to cause firing energy to flow from the brush 146 to all three controlled rectifiers 120, 122 and 124. This permits the flow of positive current to the positive brush 100 from all of the windings 24, 26 and 28.

Upon further rotation of the segment 202, the trailing edge of the segment 202 will leave or disconnect brush 162, subsequently disconnect brush 164 and finally disconnect brush 166. Thus, the controlled rectifiers 120, 122 and 124 are fired in a sequence wherein controlled rectifier 120 is fired, controlled rectifiers 120, 122 are fired, controlled rectifiers 120, 122 and 124 are fired, controlled rectifiers 122, 124 are fired, controlled rectifier 124 is fired and finally all of the rectifiers are rendered nonconductive slightly before the resolver 18 is in the position illustrated in FIG. 1.

Figure 2:
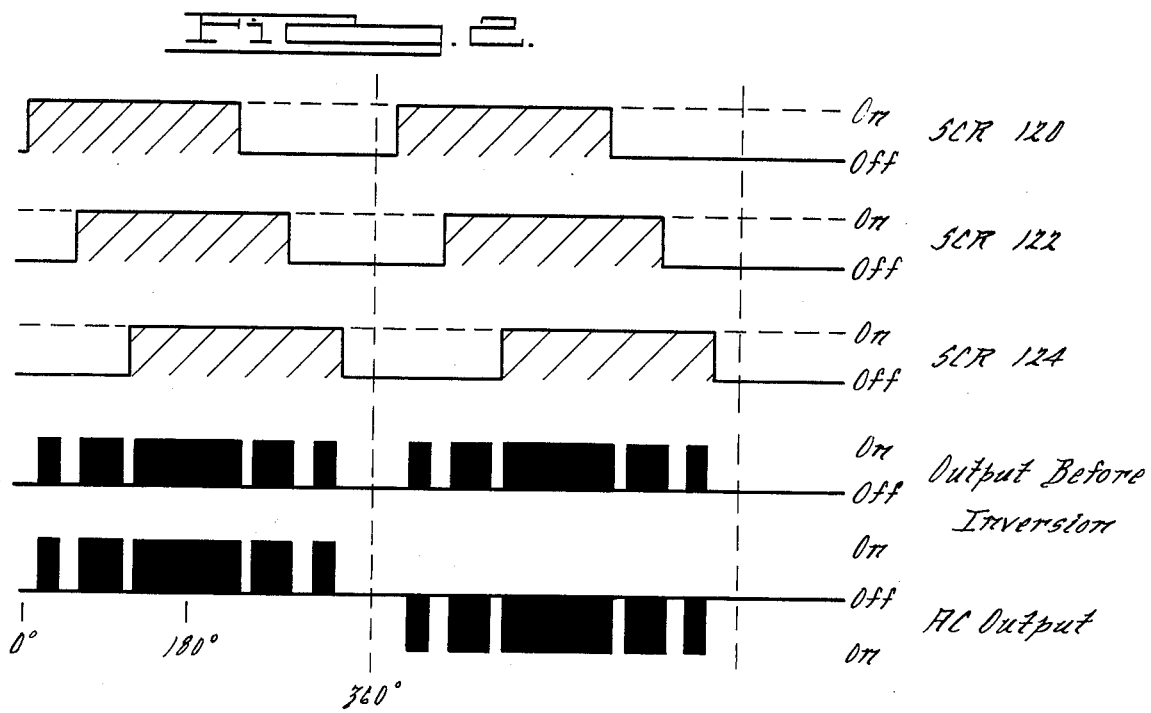
FIG. 2 is a timing diagram illustrating the operation of the controlled rectifiers within the system of FIG. 1 and further illustrating a diagrammatical representation of the 60 hertz alternating output.
Figure 3:
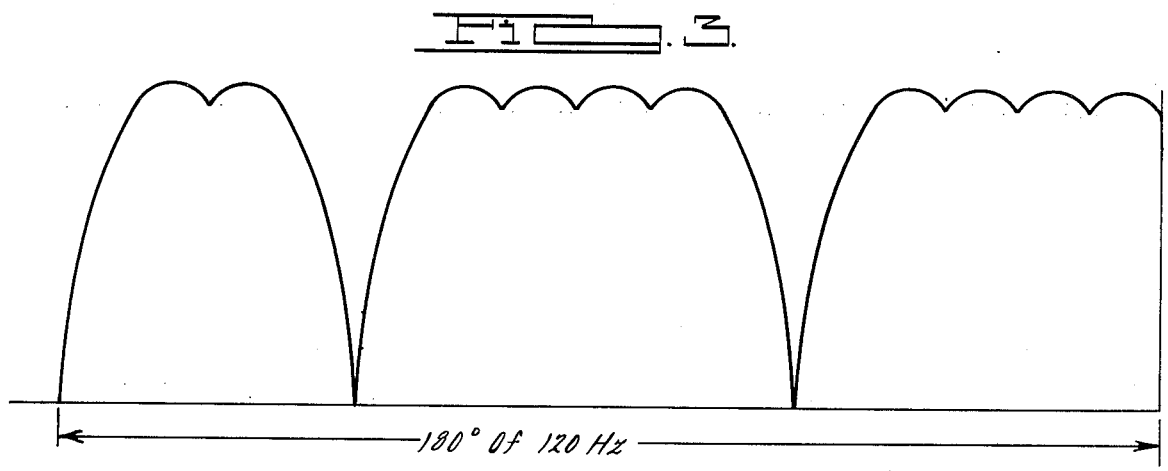
FIG. 3 is a voltage versus time waveform diagram illustrating 180° of the 120 hertz output being fed to the inverter of FIG. 1 and more clearly illustrating the waveform of the voltage pulses being fed to the inverter device.
Figure 4:
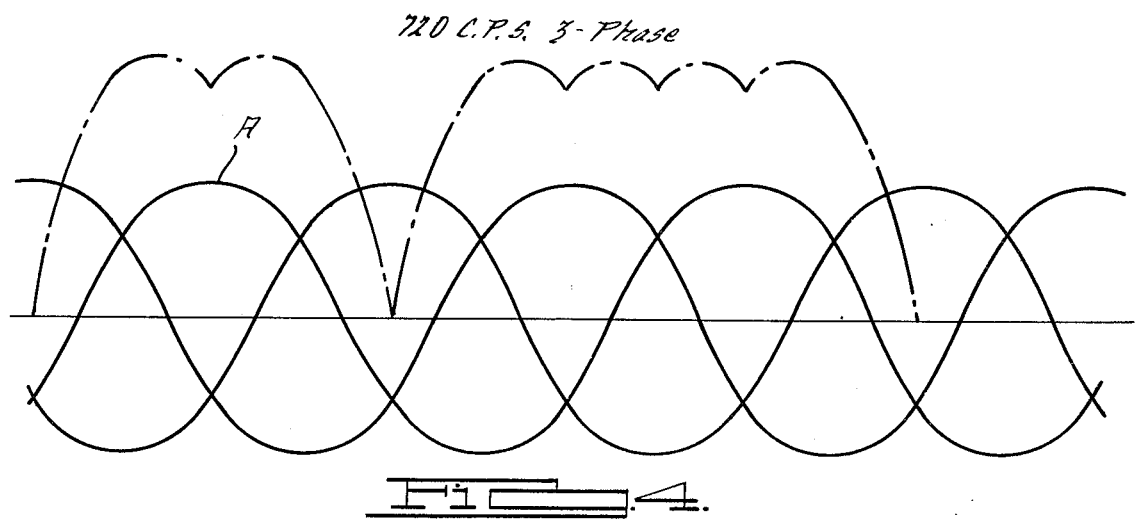
FIG. 4 is a voltage versus time waveform diagram illustrating the correlation between the three-phase, high frequency electrical energy being generated by the alternator as it is correlated with the 40° to 60° and 60° to 80° portions of the output waveform illustrated in FIG. 3.

Reserving the shape of the output energy for a discussion of FIGS. 2 through 4, it is seen that positive output energy from any conductive controlled rectifier is fed to the brush 100 and negative energy is fed to the brush 106 by means of conductors 104, 110, respectively. With the inverter 14 rotating in a clockwise direction, the same direction as the resolver 18, the inverter forms a double pole, double throw switch which is rotating at a speed onehalf the speed of the resolver 18. This effectively switches the output terminals back and forth between the positive and negative brushes 100 and 106 respectively.

Specifically, one output brush 204 is adapted to slide on conductive segments 206 and 210 and another output brush 208 is adapted to slide on the conductive segments 210 and 206. It is to be noted that the segments 102, 108, 206 and 210, when associated with brushes 100, 106, 204 and 208 form a slip ring type of device. Also, the brush 204 is positioned rotationally 180° from brush 208 as the segments 206 and 208 occupy an arc which is approximately one-half of the circle on which the brushes slide. The brushes 204 and 208 are connected to a pair of output terminals 212 and 214 respectively, which are adapted to be connected to the load. The output terminals are provided with a compensating capacitor 216 connected thereacross to compensate for inductive load connected to the output terminals 212, 214. In this way, transient voltages which may occur at the output can be absorbed at switching.

In the position shown, any positive current flowing into the positive brush 100 is fed to the brush 204 through the conductive segments 102 and 206 to thereby render the output terminal 212 positive. On the other hand, any negative current flowing in brush 106 is fed to the brush 208 through the conductive segments 108 and 210, thereby rendering the output terminal 214 negative. Upon further rotation of the inverter 14, the brush 204 will leave the trailing edge of the segment 206 and the brush 208 will leave the trailing edge of the segment 210. It is to be pointed out that the brushes 204 and 208 are of sufficient width to bridge the gaps between the conductive segments 206 and 210. In this way, all four brushes 100, 106, 204 and 208 are shorted for a period of time when the switch is being transferred from the position where brush 204 is positive and brush 208 is negative to the position in which brush 204 is negative and brush 208 is positive. As will be seen from a description of FIGS. 2 to 4, this switching occurs at exactly zero voltage output from the alternator 12, thereby under resistive loads avoiding the switching operation when any current is flowing from the alternator. However, as a further safety in avoiding switching while current is flowing in the load, the brushes 204 and 208 bridge the gaps to thereby short the output from the control circuit 16 and also to short the output terminals 212 and 214. This will insure that inductive currents flowing in the load circuit for high power factor loads also will be shorted during the switching period.

In operation, the prime mover is initially started and ignition primary pulses are generated at input terminal 42. These pulses of energy are fed through the diode 44 and resistor 46 to the capacitor 40 and stored therein. When the charge in capacitor 40 reaches a sufficient level to cause diode 38 to be forward biased, exciting current is fed to the field winding 30 of the alternator 12 through the brushes 68 and 64 connected across the capacitor 40 and thence to the fixed connections 70, 72 connected to the winding 32. This exciting current causes alternator 12 to produce an output voltage. This output voltage is fed to the primary winding 78 of a transformer 76, the secondary winding 84 of which is connected to a running excitation circuit including a field regulator 92. This field current is also fed to the brushes 64, 68 through the diode 96 and the diode 38 is back biased and is rendered nonconductive. This forms the starting cycle for the alternator 12.

As alternator 12 is generating energy, this energy is fed through a full wave bridge 16, including controlled rectifiers 120, 122 and 124 and diodes 132, 134 and 136. Assuming one or more of the controlled rectifiers 120, 122 and 124 are rendered conductive, positive energy from the alternator 12 is fed to a positive brush 100 associated with the inverter 14 and negative energy is fed to the brush 106 also associated with the inverter 14. The inverter 14 forms a double pole, double throw switch whereby the positive energy at brush 100 is fed to brush 204 for one-half the cycle and then to brush 208 for the other half of the cycle caused by the rotation of inverter 14 in the clockwise direction. With the switching arrangement caused by inverter 14, the 120 hertz unidirectional energy is converted to 60 hertz sinusoidal energy, the sinusoidal waveform occurring as a result of a time modulation of the energy being fed to the brushes 100 and 106.

The firing of the controlled rectifiers 120, 122 and 124 is controlled by the resolver 14 wherein the three brushes 162, 164 and 166 are sequentially connected to the source of firing energy at brush 146 in the manner explained above. The firing energy is derived from the transformer 76, and particularly secondary winding 140 thereof and peak limited by means of a Zener diode 158. Accordingly, the controlled rectifiers 120, 122, and 124 are sequentially connected into circuit and rendered conductive. This operation creates the time modulated output wherein the average current or average power being fed to the output terminals 212 and 214 takes a generally sinusoidal waveform.

Referring now to FIG. 2, there is illustrated a schematic representation of the on-time of the various controlled rectifiers corresponding to controlled rectifiers 120, 122, 124, the output fed to the inverter, and finally the output derived from the inverter and fed to the load. It is seen from FIG. 2 that the on-time of the various controlled rectifiers is correlated, one with the others, as described above. Specifically, the first rectifier is on for a period of time and then the second rectifier is turned on. After a further lapse of time, the third rectifier is turned on to cause current to flow from all three phases of the alternator.

This creates the symbolic waveform illustrated at the bottom of FIG. 2 and labeled "output before inversion". It is seen that the output is unidirectional and has a constant amplitude. In one embodiment of the invention, a 24-volt 35 ampere automotive alternator has been utilized and produced an output voltage of approximately 160 volts. It is further seen that during the period that the first SCR is rendered conductive, the output energy fed to the inverter takes the form of a pulse of relatively short duration. It is to be understood that these pulses are schematic and a study of FIGS. 3 and 4 and the following description relating thereto will describe the output waveform in greater detail. When the second contolled rectifier is rendered conductive, the pulse has a duration of approximately twice the duration of the first pulse and is of equal amplitude. Further, when all three controlled rectifiers are conductive, the output is generally steady and without interruption. It is to be understood that the waveform illustrated in FIG. 2 is representative of the average current flowing during the time that the controlled rectifier is on and also represents the average power being fed to the load.

The system subsequently turns off the second controlled rectifier to reproduce the double duration pulse present when the first and second rectifiers were on during the upward slope period. Finally, the third rectifier is the only rectifier conductive and the first pulse is reproduced. After that, all three rectifiers are off for a preselected time until the second cycle depicted is initiated and completed.

The description of the inverter 14 above serves as an explanation for the inversion illustrated in the timing diagram labelled AC output. It is seen that the output before inversion is a 120 hertz output and the inversion causes that frequency to be converted to a 60 hertz output. The postive half cycle is identical to the negative half cycle in view of the identity of each cycle in the 120 waveform.

Referring now to FIG. 3, there is illustrated a more representative diagram of the output waveforms being fed to the inverter. The pulses illustrated in FIG. 3 represent 180° or one-half cycle of the 120 hertz signal being fed to the inverter. It is seen that the relatively narrow pulse illustrated in FIG. 2 is, in actuality, a rising voltage which peaks out and then takes a dip and finally creates a second peak which then falls off to zero. A description of FIG. 4 to follow will more clearly explain the cause of this dip. The first pulse represents the period when only one controlled rectifier is conductive, the next pulse with the triple dip represents the period when two controlled rectifiers are conductive and the final four peak portion illustrates the output fed to the inverter during the period when all three controlled rectifiers are conductive. Note that this representation is 180° of 120 Hz but represents 90° of 60 Hz and hence the remaining 180° of Hz is symmetrical i.e. the last wave shown extends for eight peaks followed by the four peaked wave and the two peaked wave. It is to be noted that the dip is approximately 3% of the total amplitude as is typical in full wave bridges of this type.

Referring now to FIG. 4, there is illustrated a schematic representation of a three-phase alternating current wave which is typically delivered from a three-phase source and the correlation of the output waveform, illustrated in dot-dash lines, when one controlled rectifier is rendered conductive and when two controlled rectifiers are rendered conductive. Referring specifically to the first wave shown in dot-dash lines, it is seen that the dot-dash wave starts at a point where one of the phases marked "A" crosses another phase in the negative region of the diagram. Wave "A" then continues upwardly and crosses zero and creates a positive peak. It is at this peak that the superimposed dot-dash wave creates a valley after having peaked. Subsequently, the dot-dash wave again peaks and goes to zero at the point where wave "A" crosses another phase in the negative region. The second superimposed waveform illustrated in dot-dash lines is the waveform created when two controlled rectifiers are rendered conductive, thereby creating four peaks for the superimposed waveform. It is seen that this superimposed waveform is also correlated with wave "A".

The peaks and valleys of the two waveforms illustrated occur due to the conduction of the controlled rectifier which has been rendered conductive and also the conduction of at least one diode in the negative direction. It is a correlation of a conduction of all of the diodes when the system which creates the waveform illustrated in dot-dash lines. It is to be understood that the power output from the alternator has no fixed zero but rather floats so that at any instant of time the point which may be picked at zero will vary from the previous instant of time wherein another point was zero. The final eight peak output when the three controlled rectifiers are rendered conductive occurs in a similar fashion.

Note that what is provided is relative switching in the rectifier circuit whereby the rectification is varied to provide pulse width modulation. In this regard it should be understood that actual full wave rectification occurs only when all three controlled conduction devices are conductive i.e. or when the eight peak wave is produced. Hence in the present invention modulation is not performed after rectification, i.e. on the output of a fully rectified wave, but rather during rectification whereby the degree of full phase rectification is varied.

An objective here is to provide a wave which simulates a sinusoidal wave and this is done by selecting the number of phases rectified at any one time. It should be understood that the width of pulses to comprise the output could be selectively varied depending upon the frequencies involved, etc.

It is significant, however, and has been found advantageous to perform switching both of the controlled conduction devices and of the inverter at zero volts. The output voltage is shown to be of aconstant amplitude. Actually the amplitude can vary depending upon the nature of the load, the impedance of the alternator 12, regulation, etc. Where reference is made to an output voltage having a constant voltage waveform what is meant is that the same wave simulation is provided by the pulse width modulation and not by variation of voltage amplitudes.

In FIGS. 5-10 a modified form of the invention is shown in which the controlled conduction devices have been eliminated and a modified resolver provided to perform the switching function.

Figure 5:
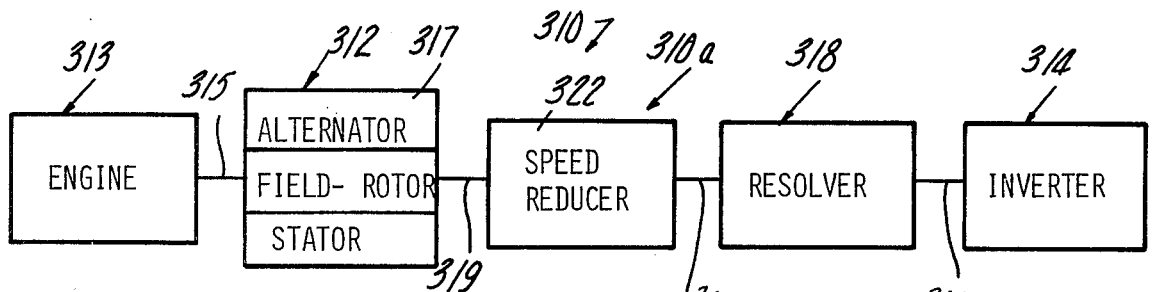
FIG. 5 is a block diagram illustrating the mechanical details of a modified form of the present invention.

Referring now to the drawings, and particularly to the details generally illustrated in the schematic and block diagrams of FIGS. 5 and 6 thereof, an energy conversion system 310 is depicted which includes a mechanical drive system 310a and an electrical system 310b having a high frequency multiphase alternating current generator or alternator 312, an output inverter 314 to which the output of the alternator is fed through a full wave rectifier bridge circuit 316 via a resolver unit 318.

Looking to FIG. 5, the alternator 312 has been selected to be of the type which generates a three-phase, 960 hertz output power and is driven by prime mover 313. The prime mover 313 can run at a speed to drive the alternator 312 at 9,600 rpm.

A prime mover shaft or other coupling 315 is directly coupled to a rotor 317 which carries the field windings of the alternator 312 to rotate the field windings at a substantially constant speed; in the illustrated example the alternator 315 is turned at 9,600 rpm via a gear or belt drive. A shaft 319 from alternator 312 is connected with a speed reducer 322 which is also driven at 9,600 rpm. The resolver 318 and inverter 314 are connected to be driven by an output shaft 311 at the output of speed reducer 322. The gear reducer 322 is adapted to drive the inverter 314 and resolver 318 at a speed less than that of alternator 312. In view of the 9,600 rpm operating speed of the alternator 312, the gear reducer 322 has a desired reduction whereby the inverter 314 and resolver 318 operate at 3,600 rpm. With the alternator 312 being a twelve pole machine, the output voltage of the inverter 314 will be a single phase output at a frequency of 60 hertz.

Looking now to FIG. 6, the alternator 312 has field or rotor windings 324 on rotor 317 and adapted to be rotated therewith and has output or stator windings 326. The output from stator windings 326 is transmitted to rectifier 316 where selective rectification occurs. The rectifier 316 is connected to the resolver 318 which operates with the rectifier 316 to selectively control the number of phases rectified at any one time whereby a modulated output is provided wherein a series of half wave pulses result having a shape which approximates a series of half wave sinusoid. This will be more readily seen from details to be discussed. The modulated wave is then inverted on alternate pulses via inverter 314 whereby an alternating current output will be applied to a load 332.

The resolver 318 and inverter 314 define a commutator like structure and hence are mechanical switches, i.e. brush type. It has been found that with resistive loads or low power factor loads where the voltage and current are closely in phase there is no problem of arcing when the circuit is opened during switching. However, with medium to low power factor or inductive loads substantial arcing can occur resulting in damage to the switching components i.e. brushes, etc. This arcing is minimized by an arc suppressor circuit 334.

In addition to the arc suppressor circuit 334, the output of the alternator 312 is regulated by means of a field regulator circuit 336 which senses the output voltage and varies the current to the field windings 324 accordingly.

It is possible under certain extreme inductive load conditions to encounter high output currents at the opening of the last resolver switch. The magnitude of this current can be so high that the arc suppressor circuit 334 could not commutate properly and current would be flowing during subsequent mechanical switching. To prevent damage, this extreme condition is sensed by a ring current detector circuit 338 which acts on the regulator circuit 336 to shut the alternator 312 down. It should be noted that the latter condition would occur only when an improper or excessive load is applied at load 332 which essentially is beyond the expected capacity of alternator 312.

Along the same line as the above, there can also occur an actual fault in load 332 which again could exceed the capacity of alternator 312. In this case a thermal breaker is provided to sense this condition and opens the field circuit to shut the alternator 312 down; this is done by overload protection circuit 337.

In addition there can appear high voltage spikes which are not detected by ring current detector 338; in this case a thermal device is used to sense this condition and operate on the field regulator 336 to shut the alternator 312 down. This is done via a spike detector circuit 340.

With the above background let us now look to the details of the various particulars of the system 310 as shown in FIGS. 7A and B. Note that in FIGS. 7A and B connection points such as 1 and 2 or 4 and 5 are connected to similarly numbered points whereby the associated circuits are completed.

The alternator 312 includes a plurality of armature windings 344, 346, 348 which are interconnected in a wye configuration without a center tap and represent phases 1 through 3, respectively. The windings 344, 346, 348 are wound on the stator poles while the field windings 324 are wound on a rotor. The field windings 324 are provided with exciting energy from the field regulator circuit 336 by means of a pair of conductors 350, 354.

The output voltages at windings 344, 346, and 348 are connected to the rectifier circuit 316 which comprises a plurality of diodes D1-D6 which are connected as a full wave bridge; however, as will be seen the operation of the bridge 316 is modulated by the resolver 318 to provide the desired output. Diodes D1-D3 have their anodes connected together to a system ground conductor 356 and have their cathodes separately connected to each phase windings 344, 346, and 348, respectively. Diodes D4-D6 have their anodes separately connected to each phase winding 344, 346 and 348, respectively, and have their cathodes connected to conductors 364, 366 and 368, respectively, of switches 370, 372 and 374, respectively at the resolver 318. Resolver 318 is symbolically represented by the switches 370, 372 and 374 which cooperate with conductors 364, 366, and 368 respectively, to complete their respective switches with the latter conductors being connected together via conductor 376. The output from resolver 318 will appear across conductors 376 and 356. In a manner to be more readily seen, the resolver 318 modulates the rectified output received via timed pulse combination to provide a wave which when integrated, closely resembles a sinusoidal wave. The output, however, at conductor 376 and 356 would appear as a direct voltage of pulsating half waves. Inversion of alternate half cycles is performed by inverter 314. Inverter 314 is symbolically represented as a double pole double throw switch and includes input contacts 377 and 357 which are electrically connected to conductors 376 and 356, respectively. At the same time a pair of output contacts 379 and 359 are alternately connected between contacts 377 and 357, respectively, and 357 and 377, respectively, on alternate half cycles. The result is that the pulsating direct voltage is now changed to an alternating voltage, with each half cycle having a shape simulating a sinusoidal wave as a result of the timed pulse combination referred to above. Contacts 359 and 379 are connected to output conductors 381 and 383, respectively, which are in turn connected to the load 332.

The switches 370, 372 and 374 symbolically represent the structure of resolver 318 where the switches are actually brush and slip ring constructions as shown in FIGS. 9 and 10. In the same manner contacts 357, 377 and 359, 379 symbolically represent the structure of inverter 314 and are actually brush and slip ring constructions as shown in FIGS. 9 and 10.

Looking now to FIGS. 9 and 10 the resolver 318 and inverter 314 are shown on a common assembly which includes a rotor structure 380 and a stator structure 382. The rotor structure 380 includes a ground segment 384 and a common segment 387. Both are made of conductive materials and are insulated from each other. Rotor structure 380 includes two side-by-side insulating segments 386a and 386b located diametrically opposite two additional side-by-side insulating segments 388a and 388b. The insulating paired segments 386a, 386b and 388a, 388b each define approximately 90° at the outer circumference of the rotor 380, thereby leaving two outer conductive portions 399 and 401 of approximately 90° each of common segment 387.

The ground segment 384 has a radial outer portion 390 which extends arcuately only partially and terminates at opposite ends in diametrically opposed insulating segments 392 and 394. Segments 392 and 394 are of relatively short width circumferentially being generally just sufficient to fully accommodate a brush, in a manner to be seen.

With insulating segments 392 and 394, the outer portion 390 of ground segment 384 extends for slightly less than 180° and likewise of identical extent is a complementary radially inner portion 396 of the common segment 387. The ground segment 384 has a continuous center portion 398 located radially inwardly from outer portion 390.

The stator structure 392 has a ground brush 400 located to electrically contact the center portion 398 of ground segment 384. A pair of inverter brushes 402 and 404 are diametrically oppositely located on stator structure 382 in radial positions to electrically contact the inner portion 396 of common segment 387, and of the insulating segments 392 and 394 and outer portion 390 of segment 384. Three separate brushes 406, 408 and 410 are located to be in electrical contact with outer portions 399 and 401 of common segments 387 and with insulating segments 386a, b and 388a, b. In essence then brushes 402 and 404 correspond to contacts 359 and 379, respectively, of inverter 314 while segment portions 390 and 396 correspond to contacts 357 and 377, respectively, of inverter 314.

With regard to brushes 406, 408, and 410 these correspond to conductors 364, 366, and 368, respectively, of resolver 318 while segment portions 399 and 401 and insulation segments 386a, b and 388a, b correspond to switch portions 370, 372 and 374 of resolver 318. Note in this regard, that the common electrical circuit of outer portions 399 and 401 of common segment 387 with inner portion 396 of segment 387 defines the conductor 376. The brushes 406 and 410 are located 60 mechanical degrees from each other and each are located 150 mechanical degrees from brush 408. It will be seen, however, that brush 408 functions electrically the same as if it were located in between brushes 406 and 410 and hence brush 406 is effectively 30° from brush 408 which in turn is 30° from brush 410.

Assuming that the rotor structure 380 rotates counterclockwise the various voltage waveforms of curves (A) through (H) shown in FIG. 8 will result. Thus curves (A)–(C) depict the rectified phase voltages at each phase ($0_1$ to $0_3$) with respect to ground i.e. at contacts 364, 366, and 368. Curves (D)–(F) depict the modified output ($0_1'$ to $0_3'$) of each phase at the output of the resolver 318. It can be seen that each phase has alternate "on" times and "off" times for approximately 90° each. This is provided by the 90° insulating segments 386a, b and 388a, b which alternate with the conducting sections 399 and 401 of common segment 387. As noted, the brushes 406, 408 and 410 are located effectively 30° apart. Thus as shown in curves (D)–(F) the $0_1'$ voltage will be switched in first; 30° later the $0_2'$ voltage will be switched in; and 60° later the $0_3'$ voltage will be switched in. The interruption of modified phase voltages $0_1'$–$0_3'$ will occur on the same order, i.e. with the $0_3'$ voltage being opened last. The modified phase voltages $0_1'$–$0_3'$ are summed as seen in curve (G) and will result in the time width modulated wave shown. Upon inversion of alternate half cycles via the inverter 314 the output wave shape will be as shown in curve (H). The integrated result of the wave shape of curve (H) closely resembles the sinusoidal wave shown in curve (I). Thus the resolver 318 in combination with the rectifier 316 can be considered as a controlled rectifier since the resolver switches to control the rectification through rectifier 316.

The gear reducer 322 is selected to reduce the rpm of the resolver 318 and inverter 314 from 9,600 rpm to 3,600 rpm. Since alternator 312 is a twelve pole machine, the result will be the conversion of the 960 Hz generated three phase a-c voltage at windings 344–48 to a single phase 60 Hz a-c output voltage.

With the above in mind, let us now look to the field regulator circuit 336. As noted the field regulator circuit 336 is electrically connected to the field windings 324 via conductors 350 and 354; since the field is on the rotor of alternator 312 the electrical connection is made via conventional brush and slip ring assemblies 389 and 391.

Direct current potential is provided for the field 324 by a full wave bridge 403 which is comprised of conventionally connected diodes D7–D10. The input of bridge 403 is connected to the secondary winding 405 of a current transformer T1 which has its primary 407 serially connected in the phase three leg 348 between connection points 1 and 2. Note that one end of the primary winding 407 is connected to the point 2 connection while the other end is connected to the point 1 connection via the primary winding of a booster transformer T2 via conductor 409 (see interconnection to FIG. 7B).

The output from the bridge 403 is taken via conductors 411 and 413, with conductor 411 being connected to conductor 350 and brush and slip ring 389 via a thermal circuit breaker CB and with conductor 413 being connected to conductor 354 and brush and slip ring 391. The thermal circuit breaker CB is normally closed and is of a manually resettable type, i.e. not self resetting. Breaker CB is connected to a system ground conductor 415 whereby one end of the field winding 324 and of the output circuit of bridge 403 is usually connected to ground conductor 415. The other side of the output circuit of the bridge 403 is connected to ground conductor 415 via a filter capacitor C1.

A protection diode D11 is connected in reverse polarity across the field 324 to protect the contacts of breaker CB from the inductive current of the field in the event the breaker CB opens.

The voltage on field 324 is regulated by circuitry including an SCR1 which acts, in a way to be seen, to shunt out through a low impedance path selected half cycles of the output from secondary 405 of transformer T1 whereby the input to the bridge 403 is also shunted. Thus the anode of SCR1 is connected between the cathodes of a pair of diodes D12 and D13 via conductor 421. The anodes of diodes D12, D13 are each connected to an opposite end of the secondary 405 of transformer T1. The cathode of SCR1 is connected to ground conductor 415 via a current limiting resistor R1. A capacitor C2 shunts resistor R1 and assists in holding SCR1 'off' after each turn off. Note that diodes D12 and D13 act as a full wave device whereby each half cycle can be shunted for selected intervals. Shunting of the bridge 403 will reduce the field voltage and current and hence the ultimate magnitude of generated voltage. Diodes D12 and D13 isolate SCR1 and assist in preventing it from latching on. A capacitor C3 shunts the diodes D12 and D13 and acts as a transient filter.

The object of regulating the current to the field 324 is to maintain the output voltage at conductors 381, 383 at a preselected level e.g. 100–125 volts a-c, rms, to simulate normal utility voltages. Hence the magnitude of output voltage is sensed in a manner to be described, and appropriate trigger pulses are provided to the gate of SCR1. A transient filter capacitor C4 is connected between gate and cathode of SCR1, while the main gate circuit includes a series circuit comprising a diode D14, a zener diode Z1 and a shunt resistor R2. The diode D14 provides back voltage protection for the gate while the breakdown voltage of zener Z1 in conjunction with the other circuit elements determines the gate voltage of SCR1.

The voltage to the gate circuit is provided by the output circuit of an n-p-n transistor Q1 which is connected as an emitter follower. Thus the emitter of Q1 is connected to the SCR1 gate circuit via resistor R2 and to ground conductor 415 via a load resistor R3.

The collector of Q1 is connected to a regulated d-c circuit 423 via a conductor 417. The regulated supply 423 is connected to the phase one leg 344 of alternator 312 via a conductor 419, a charge resistor R4 and a diode D15. The regulated supply 423 includes a capacitor C5 which has a charge path from leg 344 via resistor R4 to ground conductor 425. Diode D15 prevents discharge of C5 on negative half cycles at leg 344. The voltage level at C5 is held at the desired magnitude by the circuit of n-p-n transistor Q2 which has its emitter connected to ground conductor 425 and its collector connected to capacitor C5 via discharge resistor R5. The bias on Q2 is determined by resistors R6 and R7 serially connected across the emitter collector circuit of Q2 with the base of Q2 connected at their juncture. The transistor Q2 is biased to maintain the charge on capacitor C5 at a preselected magnitude and to provide a relatively short time discharge path when the potential at C5 exceeds that magnitude. Note that the regulated voltage at C5 and hence on conductor 417 is utilized elsewhere in the circuit and is taken off at connection point 9 in a manner to be described.

Conductor 419 is also connected to the field winding 324 via a diode D16 and light L via a conductor 424. This circuit permits the initial flow of charge current to the field winding 324 to assist in start up. Light L is used as a convenient resistance element.

The emitter-follower circuit of transistor Q1 responds to the input signal at its base to provide a similar output signal at its emitter. The input to the base of Q1 includes a rectifier circuit 412. The circuit 412 includes diodes D17–D20 which are connected as a symmetric rectifier with its input circuit connected between output conductors 381 and 383 and with its output circuit connected between conductor 414 and ground conductor 356 via ground conductor 415. A low pass filter circuit 416 includes equal resistors R8 and R9 which are connected at one of their ends to opposite sides of a capacitor C6. Resistor R8 has the same end connected to the juncture of diodes D17, D18 and its opposite end connected to output conductor 383 via conductor 418. Resistor R9 has its one end connected to the juncture of diodes D19, D20 and its opposite end to output conductor 381. Filter circuit 416 shunts out high frequency transients whereby a more uniform rectified output can be obtained.

Conductor 414 is connected to the base of Q1 via a circuit including resistors R10 and R11, which are connected together. A variable resistor R12 is connected from the juncture of resistors R10 and R11 to ground conductor 415 and defines with resistor R10 a voltage divider network such that the voltage at the base of Q1 can be set by the voltage across R12. A filter capacitor C7 is connected across R12 to further aid in filtering. A diode D21, connected from emitter to base of Q1, protects the emitter base circuit from reverse voltage breakdown. Thus a relatively clean pulsating d-c voltage will appear at conductor 414 and across R12 whereby the conduction of Q1 will be controlled. The voltage at the emitter of Q1 will follow that appearing at its base. When this voltage attains a magnitude to provide a voltage which exceeds the threshold voltage of zener Z1 a trigger pulse will result turning SCR1 "on" and substantially shorting the input to the field bridge circuit 403. This can occur on alternate half cycles as long as the output voltage across conductors 381 and 383 exceeds the desired magnitude. Thus regulation of the output potential is provided.

In order to prevent hunting and to provide stability to the circuit, a negative rate feed back circuit 420 is provided. A resistor R13 is serially connected to a capacitor C8 and defines therewith an integrating circuit which is connected between conductor 413 and ground conductor 415. Thus the potential on capacitor C8 will be an integration of the output field voltage at the output circuit of field bridge 403. Since hunting would result in fluctuating of field voltage, hunting can be inhibited by retarding the response time of SCR1 in accordance with the rate of change in field voltage. Thus a first differentiating circuit comprised of a capacitor C9 and serially connected resistor R14 is connected to capacitor C8 and will provide an output voltage in accordance with the rate of change of potential at C8. This will now provide a means of anticipating rapid changes in field voltage. The range of the circuit is extended by a second parallely connected differentiating circuit comprised of a capacitor C10 and serially connected resistor R15. The differentiating circuits also include a common resistor R16 connected from the juncture of resistor R14, R15 to ground conductor 415.

The output of the differentiating circuits is connected to the base of emitter-follower transistor Q1 via resistors R17 and R18. A diode D22 is connected from ground conductor 415 to the juncture of resistors R17 and R18 and operates to prevent the circuit from attaining a negative potential. The potential which is applied to the base of transistor Q1 is positive and will result in Q1 turning SCR1 on sooner, thereby retarding increases in field voltage and thereby inhibiting hunting. Note that the potential at the base of Q1 is further modified via a signal applied at a point 3 from the ring current level detector circuit 338, which provides stability in a manner to be described.

FIG. 10 depicts the rotor 380 after it has rotated counterclockwise to a position just prior to inversion. Thus in FIG. 10 it can be seen that the $\phi_3$ potential will be the last to be interrupted as the circuit between brush 410 and conductive outer portions 399 or 401 is broken. At this time inverter brushes 402 and 404 are still in partial electrical contact with the inner portion 396 of common segment 387 and outer portion 390 of ground segment 384. This can be seen from FIG. 10 which depicts the position of the components just as brush 410 is about to be opened. At this time the inverter brushes 402 and 404 are beginning to engage insulating segments 392 and 394 but are still in electrical engagement with conductive portions 390 and 396. Thus the final switching of the phase three voltage and therefore of the voltage and current at output lines 381 and 383, will be made between the phase three brush 410 and its associated conductive ring portion 399 and 401.

Under resistive or high power factor loads the voltage and current will be substantially in phase and switching can occur with no difficulty since it is synchronized to occur at zero volts output. However, where medium to low power factor loads, i.e. mainly inductive, are encountered the current at zero voltage or at point of switching can be quite high. Switching this type of load can result in arcing and damage to the brush 410 and associated conductive portion. This problem is solved by the arc suppression circuit 334. Essentially the circuit 334 senses the initial reduction in load current as the circuit begins to open. Upon attainment of a preselected magnitude a solid state switching circuit is actuated to provide an alternate path around the brush 410. This circuit is maintained actuated until the phase brush 410 is opened and is deactuated before the circuits of inverter brushes 402 and 404 are opened. Note that inverter brushes 402, 404 will initiate contact for polarity inversion slightly before the phase one brush 406.

As noted the arc suppressor circuit 334 provides an alternate path for the current from the load 332 under the zero volt switching condition as the phase three resolver switch begins to open. This path is provided by the principal electrodes of an SCR2. As the phase three switching occurs to completely open the circuit from the resolver 318 to the load 332 the current begins to drop rapidly. If the opening of the switch continued the drop in current would be accompanied by an increase in voltage as a result of the inductive action of the load. This voltage at the phase three switch, i.e. brush 410 and segment portion 399 or 401 of common segment 387, could result in arcing. As will be seen the suppressor circuit 334 acts to provide the shunt path before the phase three switch has opened and hence before arcing can be initiated. Thus the suppressor circuit 334 includes a pulse transformer T3 which has its primary winding 428 connected in series with the full wave rectified output from bridge 316 via connection points 4 and 5 in the brush three line. Upon a sudden drop in current in the brush three line resulting from the initiation of switch opening, the current through primary 428 will drop sharply resulting in a pulse being induced in secondary winding 430. The secondary winding 430 is connected across the gate to cathode trigger circuit of SCR2. The latter circuit includes a coupling capacitor C12 and resistor R19 which are serially connected from one side of secondary 430 to the gate of SCR2. The opposite side of secondary 430 is connected to the cathode of SCR2 via conductor 432. A resistor R20 and serially connected diode D24 are connected across the secondary 130 and define with capacitor C12 a band pass filter to sharpen the pulse from secondary 430. In this regard a capacitor C13 is connected from conductor 432 to the juncture between capacitor C12 and resistor R19 and defines a low pass filter to shunt out high frequency signal components whereby the trigger pulse will be sharpened. A diode D25 is connected across capacitor C13 and provides a path for induced currents from pulse transformer T3 when the phase three switch opens interrupting the current through primary 128 via connection points 4 and 5. A capacitor C14 is connected to the cathode of SCR2 via conductor 432 and to its gate via a resistor R121. A diode D26 is connected from the juncture of resistor R21 and capacitor C14 to the anode of SCR2. The latter components define a hold off circuit which maintains SCR2 non-conductive following commutation.

As noted, SCR2 has its cathode connected to conductor 432 but its anode is connected to ground via a system ground conductor 434. (It should be noted that the ground conductors referred to are a system ground and all conductors so designated are electrically connected together; however the noted system ground is isolated from any other ground, i.e. at the load 332, etc.) Each of the output conductors 381 or 383 is alternately connected to system ground via inverter 314 which has one switch side connected to ground conductor 356 (which by prior definition is electrically connected to ground conductor 415 and 434). The output conductors 381 and 383 are also connected to the cathode of SCR2 via diodes D27 and D28, respectively, and a primary winding 436 of a pulse transformer T4 and conductor 432.

Diodes D27 and D28 have their anodes connected together and have their cathodes connected to the associated one of the output lines 381 and 383, respectively. Note that the voltage induced by the inductance of the load 332 in response to switching will reverse itself in polarity on alternate half cycles just as the current will reverse itself in polarity. Thus when conductor 383 was positive and 381 negative, a positive current from 383 to 381 will occur and this current flow will attempt to continue as the voltage between 383 and 381 begins to approach zero. As the current drops in magnitude when the phase three switch begins to open the inductance at the load 332 will induce a positive voltage at conductor 381 relative to 383. Conductor 381, however, is at that time connected to the system ground via inverter 314 and conductor 356 and hence a positive potential will be applied to the anode of SCR2 via conductor 434. At the same time output conductor 383 is connected to the cathode of SCR2 via diode D28 whereby a shunt path around the phase three switch will be completed. On the alternate half cycles the polarity of 381 and 383 will be reversed and inverter switch 314 will be in its alternate position such that the now positive conductor 383 will be connected to system ground and the anode of SCR2 and the negative conductor 381 will be connected to the cathode of SCR2 via diode D27. Note that the current through the primary 428 of pulse transformer T3 will be unidirectional since it is taken at contact points 4 and 5 and hence would be a pulsating direct current. The pulse transformer T3 and associated trigger circuit for SCR2 will not provide a trigger pulse for normal current decay but will respond to the rapid current decrease which occurs as the phase three switch is being opened.

SCR2 can be triggered into conduction on each half cycle and will initiate conduction before the phase three switch has completely opened the circuit. As noted, the inverter brushes 402 and 404 are still conducting and have not yet completely opened, i.e. have not completely moved onto insulating segments 392 and 394. In fact the shunt path around the phase three switch utilizes the circuit through the inverter brushes 402 and 404 for the path to the system ground. It is important then that the SCR2 be rendered non-conductive to open the shunt circuit before the inverter brushes 402 and 404 completely open via engagement with the associated insulating segments 392 and 394 or arcing will occur. Thus the turnoff of the SCR2 circuit is controlled to occur prior to the circuit of the inverter brushes 402 and 404 opening.

SCR2 is turned off or commutated by SCR3 which has its cathode connected to the cathode of SCR2 via a resistor R22 and conductor 432. SCR3 has its cathode connected to a commutation capacitor C15 via an inductance coil L1. C15 has one side connected to ground. When SCR3 is rendered conductive it will apply at conductor 432 and at the cathode of SCR2 a positive voltage which exceeds that at the SCR2 cathode and hence will bias SCR2 into non-conduction. The voltage for the principal electrodes of SCR3 is provided by the charge placed on capacitor C15. C15 is charged from a full wave rectifier bridge 436 which is comprised of diodes D29–D32 conventionally connected in the bridge configuration. One leg of bridge 436 is connected to the rectified output of the phase three leg at diode D6 via conductor 442 such that positive charge current can flow to capacitor C15. The voltage is boosted via the booster transformer T2. Thus the input circuit for bridge 436 is energized from secondary winding 438 of the booster transformer T2 which has its primary winding 440 connected to the third phase leg winding 348 via connection point one and via primary 402 of current transformer T1 to connection point 2. The booster transformer T2 is utilized in conjunction with the charge current from the phase three leg via conductor 442 to assure the attainment of a potential charge on C15 adequate to commutate SCR2 off when SCR3 conducts.

The rectified output from rectifier circuit 436 is connected to the capacitor C15 and inductance L1 via a diode D33 and charge resistor R28. Diode D33 provides back voltage protection for the rectifier circuit 436.

SCR3 is turned on by a trigger pulse applied to its gate circuit via a unijunction transistor UJ1. The triggering of UJ1 in turn is timed to provide a preselected delay from the time that SCR2 starts conducting in order to permit the phase brush 410 to have completed its switching operation. In other words the shunt circuit provided by SCR2 in conduction is maintained until phase three brush 410 has switched. Note that at this time the shunt circuit includes inverter brushes 402 and 404. The shunt circuit must be opened before inverter brushes 402 and 404 open so that their opening can also be under a no load condition. The timing of the shunt circuit provides the proper sequence whereby the ultimate breaking of the load circuit is provided via SCR2. Thus establishment of the shunt circuit permits the resolver brush 410 to be opened under low or no load and the subsequent opening of the shunt circuit permits opening of the inverter circuit via brushes 402 and 404 under no load. Note that the maintenance of a circuit through inverter brushes 402, 404 until resolver brush 410 opens can be provided by providing brushes 402, 404 to be wider than brush 410. In one form of the invention a delay of 100 usec. was provided.

Initiation of timing is provided by pulse transformer T4, the primary winding 436 of which is connected in the free wheel circuit or shunt path provided by SCR2. T4 has a secondary winding 444 which provides pulses in response to initiation of conduction through the primary 436. A diode D34 is connected across secondary 444 to provide a reverse voltage path. One side of secondary 444 is connected to the emitter of UJ1 via a charge capacitor C16 while the other side is connected to one base of UJ1 via diode D35 and resistor R29. A charge resistor R30 is connected from the emitter of UJ1 to the juncture D35 and R29 and is a part of the charge circuit for capacitor C16. A zener diode Z2 is connected across the circuit charge storage capacitor C17a which maintains voltage for charge to C16. Zener Z2 will insure a relatively uniform voltage across C17a and hence at R30 and C16, the voltage across Z2 and hence charge of C17a will rise quickly to the regulated level because of the action of pulse transformer T4. The resistor R30 and capacitor C16 have a selected RC time constant whereby the potential at the emitter of UJ1 as provided by capacitor C16 will reach the firing point at a preselected time after initiation of free wheel or shunt current through T4. Z2 assures that the bias on UJ1 will be uniformly maintained such that firing will occur at the same potential at capacitor C16 and hence at the same elapsed time from shunting.

The other base of UJ1 is connected to the gate of SCR3 via a dropping resistor R131 while a return path to capacitor C16 is provided via a conductor 446 from the cathode of SCR3. Note that it is the charge on capacitor C16 that turns SCR3 on via UJ1.

With SCR3 now turned on capacitor C15 will provide the positive potential needed to turn SCR2 off and the free wheel path through SCR2 will be opened. When the current from C15 diminishes, inductor L1 will induce a voltage of reverse polarity which will commutate SCR3 off. This will return the suppressor to its original state in preparation for the next switching operation.

In order to assure that SCR3 will be held off and not rendered conductive by additional pulses from UJ1 via C16, a hold off circuit is provided. Thus a capacitor C17 is connected across the resistor R22 via a diode D35. C17 will be charged when SCR3 is rendered conductive. The charge of capacitor C17 is coupled to the gate of SCR3 via resistor R132. The charge on capacitor C17 will reverse bias the gate of SCR3. This reverse bias will appear only after UJ1 has triggered SCR3 into conduction and will assist in keeping SCR3 from being turned on again by repeat pulses from UJ1 and at the same time will improve the turn-off time characteristic of SCR3 in opening against the high free wheeling or shunt voltage impressed thereon when the L1 and C15 circuit rings.

Thus with the circuitry previously described arcing of the resolver and inverter switches is inhibited.

There are some extreme load conditions under which the suppressor circuit 334 could be subjected to currents of excessive magnitude. In the latter case arcing could ocour at the inverter brushes. This can occur when there are sharp voltage and current spikes. These spikes usually build up over a series of cycles and do not necessarily occur instantly. The occurrence of such high voltage and current peaks is indicative of an improper load being applied to the alternator 312 and hence the alternator should be shut down. This is done by the ring current level detector circuit 338.

A relatively high capacity capacitor C18 is connected across the load 332. Capacitor C18 provides a path for dumping the inductive current after shunting has been terminated, i.e. SCR2 turned off. It is the rate of rise in voltage across C18 that is sensed to determine an incipient high ring current condition. Thus a differentiating circuit 448 comprising a parallel circuit of a capacitor C19 and resistor R30 is connected to the anodes of diodes D27 and D28 via a dropping resistor R31 and to a system ground conductor 450 via resistor R32. Thus the rate of change of the voltage across C18 will be sensed by differentiating circuit 448 and will be higher at steep voltage rises at C18 and will provide an indication of the magnitude of the ring current.

The differentiated voltage is coupled to sample and hold circuit 451 via a coupling capacitor C20 and diode D37; a diode D38 is connected across C20 and R32 and a sample and hold capacitor C21 is connected from diode D37 to ground. Capacitor C21 will attain a charge having a magnitude which is a function of the peak rate of change of voltage on C18 as provided by differentiating circuit 448 and hence the faster the rise time of the voltage at C18 the greater the charge on capacitor C21. C21 is connected to the input of a pair of n-p-n transistors Q2 and Q3 which form a Darlington amplifier which is connected as an emitter follower. Thus capacitor C21 is connected to the base of Q2 while its emitter is connected to the base of Q3. Q3 has its emitter connected to ground via a load resistor R33. The collectors of Q2 and Q3 are connected together and are in turn connected to the regulated supply 423 in field regulator circuit 336 at connection point 9. The emitter follower circuit defined by Q2 and Q3 provides a high input impedance for capacitor C21 whereby its charge can be maintained. Thus as on successive cycles the voltage across C18 increases and will result in an increased output from Q3 across load resistor R33.

The potential at the emitter Q3 then is applied to a base of a unijunction UJ2 via a time delay or integrating circuit 452. Circuit 452 includes a filter capacitor C23 connected from Q3 emitter to ground conductor 450, a resistor R34 connected from Q3 emitter to the base of UJ2 and a capacitor C24 connected from that base to ground conductor 450.

The time delay circuit 452 prevents triggering of UJ2 for a selected time period, i.e. 15 to 20 cycles of the 60 cycle output, such that shut down does not occur in response to normal motor starting and/or spurious, short time transients. UJ2 has its second base connected to the movable arm 454 of a potentiometer R36 which has one end connected to ground conductor 450 and its other end connected to resistor R38 and thence to the regulated supply 423 via conductor 456 and connecting point 9. The potential across R36 is further regulated by a zener diode Z3 connected thereacross. The potential at arm 454 as applied to the second base of UJ2 establishes the set point for firing. The emitter of UJ2 is connected to a control circuit 458 (FIG. 7A) via diode D40 and conductor 460. As seen in FIG. 7A, the control circuit 458 comprises a portion of the current level detector circuit 338. Diode D40 provides reverse voltage protection for UJ2.

As previously noted, shut down in response to detection of high level voltages occurs by actuating the thermal breaker CB. This is accomplished by the control circuit 458. An SCR4 has its gate connected to the output of UJ2 via conductor 460. A resistor R39 and capacitor C25 (FIG. 7B) are connected from conductor 460 to ground and filter out noise, etc., to inhibit false firing. The anode of SCR4 is connected across output conductors 381 and 383 via oppositely connected diodes D41 and D42, respectively. The cathode of SCR4 is connected to system ground conductor 415 via a low impedance resistor R40, conductor 462 and thermal breaker CB. A diode D44 is connected from SCR4 cathode to capacitor C26. A resistor R41 provides gate drive via the charge on capacitor C26 to hold SCR4 on until CB has opened to shut down the alternator 312. Now in the event of a series of rising voltages at the output, indicative of an excessive ring current condition, UJ2 will be triggered whereby the gate circuit of SCR4 will be actuated rendering SCR4 conductive. The circuit of SCR4 will now provide a low impedance path from the output to the thermal breaker CB whereby the excessive current will actuate the breaker CB resulting in its opening and deactuating the field circuit; this in turn will shut the alternator 312 down whereby no voltage will be generated. Note that the thermal breaker CB must be manually reset. Thus protection from improper loading is provided by the level detector circuit 338.

In addition to the above it is possible to have a fault occur in the load which is of a nature that excessive voltage spikes could be generated but the resultant width, frequency or polarity of the high voltage spikes would not be sufficient to actuate the ring current level detector circuit 338. The latter condition is provided for by the thermal level detector circuit 340. It should be noted that the voltage spikes referred to are not a result of ringing after commutation but are strictly load induced.

The thermal level detector circuit 340 operates in conjunction with the gate circuit of SCR4 of the control circuit 458. A metal oxide varistor, MOV, is connected across the load 332 and hence across output conductors 381 and 383 and in the event of voltage spikes at the load 382 will experience a thermal rise. Note that the MOV will be actuated, i.e. provide bipolar breakdown condition, in response to voltage spikes normally in excess of that experienced during commutation ringing. A positive temperature coefficient resistor PTC is physically secured to the MOV in order to respond to the temperature thereof. The PTC has a resistance characteristic which is low and constant until a predetermined higher temperature is attained at which time the resistance rises abruptly. Thus the PTC will provide a quick increase in temperature upon the MOV generating sufficient heat in response to a load fault condition.

The PTC is connected at one side to system ground conductor 450 and at its other side to the regulated supply 423 via resistor R42 and conductor 457. A diode D45 is connected from the juncture of R42 and PTC to the gate of SCR4 via conductor 460. R42 and PTC define a voltage divider network and when PTC is in its normal low impedance condition the potential at diode D45 and hence at the gate of SCR4 is low and hence SCR4 cannot be triggered "on". When PTC is actuated in response to elevated temperatures at MOV to its higher resistive state, the potential at D45 rises to a level sufficient to trigger the gate of SCR4. Thus SCR4 will be rendered conductive and actuate thermal breaker CB to open the field 324 and shut down the alternator 312 in the manner previously discussed. Thus the thermal level detector 340 provides protection from overload resulting from load faults.

It should be noted that the alternator 312 will be shut down by the thermal breaker CB when the field current exceeds its rated capacity for a selected time and hence CB will provide additional overload protection as when the output current of alternator 312 is excessive i.e. short circuit, improper load, etc.

A rate capacitor C22 is connected from the emitter of Q3 in the sample and hold circuit 451 to the base of Q1 in the regulator circuit 336; hence the rate of change in current signal at Q3 will be applied to the regulator circuit 336. With induction motors and for synchronous motors there is a tendency with synthesized wave forms under certain motor load conditions for the motor to overrun. Overrun can produce instability in the regulator circuit 336 and also will result in undesirable motor hunting. As the motor overruns it appears more inductive, i.e. power factor decreases, resulting in an increase in ring current. This current is sensed by the ring current level detector 338 at levels below that which would result in shut down of alternator 312. The magnitude of ring current and hence inductance and hence magnitude of overrun will appear as a potential at the emitter Q3 and will be fed back to the base of Q1 in regulator circuit 336 via capacitor C22. An increase in voltage at the base of Q1 will speed its time of conduction and hence the firing of SCR1 whereby the field current will be decreased. The decrease in field current will tend to counter the overrun and stabilize the speed of the induction motor.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. An energy conversion system for converting multiphase, high frequency energy to single phase, low frequency energy, the improvement comprising an alternating current generator for generating the multiphase energy, full wave rectifying means connected to the output of said generator for rectifying the output from said generator to produce a unidirectional output from said rectifying means including controlled rectifying means for controlling the passage of energy from said generator through said full wave rectifying means, output switching means connected to the output of said full wave rectifying means for inverting selected portions of the unidirectional output and producing an alternating output from said output switching means, control switching means connected to said controlled rectifying means for controlling the conduction of said controlled rectifying means and controlling the flow of energy through said controlled rectifying means in accordance with a constant voltage amplitude wave form that is time modulated in coordination with the rotation of said alternating current generator, and connection means interconnecting said control switching means and said output switching means for synchronizing the conduction of said full wave rectifying means and the inversion of said selected portions of the unidirectional output.

2. The improvement of claim 1 wherein said time modulated wave is generally sinusoidal.

3. The improvement of claim 2 wherein the frequency of the output signal being fed from said rectifying means is twice the frequency of said output from said output switching means and unidirectional in polarity.

4. The improvement of claim 2 wherein said rectifying means includes at least one controllable means for each phase of said multiphase generator, each controllable means being controlled to conduct a preselected period of time to generate said time modulated wave.

5. The improvement of claim 4 wherein one of said controllable means for each phase is rendered conductive for a substantially equal period of time as each other controllable means for each phase.

6. The improvement of claim 4 wherein said controllable means are connected in parallel at the output electrodes thereof, said output electrodes being connected to said output switching means.

7. The improvement of claim 6 wherein said output switching means includes an inverter slip-ring type switching device.

8. The improvement of claim 7 wherein said slip-ring type device includes a rotating element rotating at one-half the speed of said alternating current generator and includes conductive areas and nonconductive areas.

9. The improvement of claim 8 wherein said slip-ring device includes at least four brush elements, two of said brush elements being connected as input elements to said slip-ring device and from said rectifying means, and two other of said brushes being connected as outputs from said slip-ring device.

10. The improvement of claim 9 wherein said rectifying means produces a positive polarity signal and a negative signal and slip-ring device switching said positive signal from one of said other two brushes to the other of said other two brushes.

11. The improvement of claim 10 wherein said input brushes to said slip-ring type device slide on first and second continuous conductors and said other two output brushes slide on two discontinuous conductive segments whereby one of said output brushes slides on a first of said two discontinuous segments and then a second of said two discontinuous segments.

12. The improvement of claim 11 wherein said first of said two discontinuous segments is continuously connected to one of said continuous conductors and the second of said discontinuous segments is continuously connected to said second continuous conductor.

13. The improvement of claim 12 wherein said output brushes bridge said two discontinuous segments at one point of rotation of said slip-ring device.

14. The improvement of claim 13 wherein said output brushes are positioned on said slip-ring type device at 180° of rotation of said device, one from the other.

15. The improvement of claim 14 wherein said discontinuities are positioned 180° of rotation of said device, one from the other.

16. The improvement of claim 15 wherein said four brushes are connected together at one zero voltage point in the cycle per cycle from said rectifying means.

17. The improvement of claim 16 wherein the frequency of the output signal being fed from said rectifying means is twice the frequency of said output from said output switching means and unidirectional in polarity.

18. The improvement of claim 17 wherein one of said controllable means for each phase is rendered conductive for a similar period of time as each other controllable means for each phase.

19. The improvement of claim 4 wherein said rectifier means includes a controlled rectifier for each phase of said multiphase energy.

20. The improvement of claim 19 wherein said control means includes a firing slip-ring type device for providing firing energy to said controlled rectifiers, said system further including means for feeding energy to said firing device for application to said controlled rectifiers.

21. The improvement of claim 20 wherein said firing device includes means for firing said controlled rectifiers in sequence and cause said controlled rectifiers to become nonconductive in sequence.

22. An energy conversion system for converting multiphase, high frequency energy to single phase, low frequency energy, the improvement comprising an alternating current generator for generating the multiphase energy, full wave rectifying means connected to the output of said generator to produce a unidirectional output from said rectifying means including controlled rectifying means comprising at least one controlled rectifier for each phase of the multiphase generator which is rendered conductive for a preselected period of time, output switching means connected to the output of said rectifying means for inverting selected portions of the unidirectional output and producing an alternating sinusoidal output from said output switching means, control switching means connected to said controlled rectifying means for controlling the conduction of said rectifying means and controlling the flow of energy through the controlled rectifying means in accordance with a constant voltage amplitude waveform which is time modulated in coordination with the rotation of said alternating current generator, and connection means interconnecting said control switching means and said output switching means for synchronizing the conduction of said rectifying means and the inversion of said selected portions of the unidirectional output; said control switching means comprising a firing slip ring type device with means for receiving energy for providing firing energy to said controlled rectifiers in sequence and for causing said controlled rectifiers to become nonconductive in sequence and including brushes, one brush for each phase, said firing device including a conductive segment positioned to sequentially engage each brush.

23. The improvement of claim 22 wherein said conductive segment is in the form of an arc of a circle, said arc being rotatable into sequential engagement and disengagement with each brush.

24. The improvement of claim 23 wherein said fed energy is fed to said segment.

25. The improvement of claim 24 wherein said controllable means are connected in parallel at the output electrodes thereof, said output electrodes being connected to said output switching means.

26. The improvement of claim 25 wherein said output switching means includes an inverter slip-ring type switching device.

27. The improvement of claim 26 wherein said slip-ring type device includes a rotating element rotating at one-half the speed of said alternating current generator and includes conductive areas and nonconductive areas.

28. The improvement of claim 27 wherein said slip-ring device includes at least four brush elements, two of said brush elements being connected as input elements to said slip-ring device and from said rectifying means, and two other of said brushes being connected as outputs from said slip-ring device.

29. The improvement of claim 28 wherein said rectifying means produces a positive polarity signal and a negative signal, said slip-ring device switching said positive signal from one of said two brushes to the other of said other two brushes.

30. The improvement of claim 29 wherein said input brushes to said slip-ring type device slide on first and second continuous conductors and said other two output brushes slide on two discontinuous conductive segments whereby one of said output brushes slides on a first of said two discontinuous segments and then a second of said two discontinuous segments.

31. The improvement of claim 30 wherein said first of said two discontinuous segments is continuously connected to one of said continuous conductors and the second of said discontinuous segments is continuously connected to said second continuous conductor.

32. The improvement of claim 31 wherein said output brushes bridge said two discontinuous segments one point of rotation of said slip-ring type device.

33. The improvement of claim 32 wherein said output brushes are positioned on said slip-ring type device at 180° of rotation of said device, one from the other.

34. The improvement of claim 33 wherein said discontinuities are positioned 180° of rotation of said device, one from the other.

35. The improvement of claim 34 wherein said four brushes are connected together at one zero current point in the cycle per cycle from said rectifying means.

36. The improvement of claim 35 wherein the frequency of the output signal being fed from said full wave bridge is twice the frequency of said output from said inverter and unidirectional polarity.

37. The improvement of claim 36 wherein one of said controllable means for each phase is rendered conductive for a substantially equal period of time as each other controllable means for each phase.

38. A method of converting multiphase high frequency energy to single phase, low frequency energy from a generator comprising the steps of generating the multiphase energy, rectifying the multiphase energy to produce a unidirectional output including controlling the passage of energy during said rectifying, inverting selected portions of the unidirectional output and producing an alternating output from said unidirectional output, controlling the rectification and the flow of energy during said controlling step in accordance with a time modulated, constant voltage amplitude wave form and synchronizing the rectification of the multiphase energy and the inversion of the unidirectional output with the high frequency of said multiphase energy.

39. The method of claim 38 wherein said time modulated wave simulates repetitive half cycles of the output wave and includes a constant voltage.

40. The method of claim 39 wherein the frequency of the output signal being fed during said rectifying and controlling is twice the frequency of said output after said inverting and unidirectional in polarity.

41. The method of claim 40 wherein said rectifying is accomplished by a full wave bridge and includes at least one controllable means for each phase of said multiphase generator, each controllable means being controlled to conduct a preselected period of time to generate said time modulated wave.

42. The method of claim 41 wherein one of said controllable means for each phase is rendered conductive for a substantially equal period of time as each other controllable means for each phase.

43. The method of claim 42 wherein said rectifying produces a positive polarity signal and a negative signal, said inverting switching said positive signal to one output to a load for a preselected period and another output to the load for a second, equal preselected period.

44. The method of claim 43 further including producing zero voltage during said rectifying and controlling, the method further including short circuiting said rectified and controlled output and said one and another output at said zero voltage.

45. The method of claim 41 wherein said controlling includes controlling the supply of energy during said controllable in sequence from each phase of the multiphase source.

46. The method of claim 45 further including the synchronizing of the operating of said inverting with said controlling.

47. The method of claim 46 wherein said inversion is performed at one-half the frequency of said controlling step.

48. The method of claim 47 wherein said inverting is controlled by said controlling.

49. In an engine driven electrical energy generator system having a generator with a field winding and an armature, and an engine connected in driving relation with the generator, the engine including an ignition primary circuit generating a series of electrical pulses in response to the rotation of the engine, the improvement comprising an energy storage means connected to the ignition primary for storing at least a portion of the series of electrical pulses, means connecting the energy storage means to the field for initially providing excitation energy to the field winding from the ignition primary and the energy storage means during the start-up of the generator, running field excitation means connected to the armature winding and field winding for providing exciting energy to the field from the armature winding during running of the generator, and switching means for controlling the connection of said energy storage means or the armature winding to the field winding in response to said exciting energy from the armature winding bearing a preselected relationship to the voltage at said energy storage means.

50. The improvement of claim 49 wherein said energy storage means and the armature winding is a source, and said switching means includes diode means connected in circuit with each of said sources.

51. The improvement of claim 50 wherein said diode means includes a diode connected in series between each of said sources and the field winding, one source back-biasing the diode of the other of said sources when the voltage of said one source exceeds the voltage of said other of said sources.

52. An energy conversion system for converting multiphase, high frequency energy to single phase, low frequency energy, the improvement comprising an alternating current generator for generating the multiphase energy, rectifying means connected to the output of said generator for rectifying the output from said generator to produce a unidirectional output from said rectifying means including control switch means for controlling the passage of energy from said generator through said rectifying means in a timed sequence for providing a plurality of pulses varying in width to define a plurality of unidirectional waves varying at twice the output frequency comprised of a preselected number of pulses, output switching means for receiving said unidirectional waves and inverting alternate ones thereof to produce an alternating output, and connection means interconnecting said control switch means and said output switching means for synchronizing the conduction of said rectifying means and the inversion of said unidirectional wave.

53. The system of claim 52 wherein said number of pulses of each of said waves vary in pulse width from pulses successively increasing in width to pulses successively decreasing in width whereby a sinusoidal wave shape is simulated.

54. The system of claim 52 with at least one of said control switch means and said output switching means actuable to switch at substantially zero volts.

55. The system of claim 52 with both said control switch means and said output switching means actuable to switch at substantially zero volts.

56. The system of claim 55 wherein said number of pulses of each of said waves vary in pulse width from pulses successively increasing in width to pulses successively decreasing in width.

57. The system of claim 56 with said control switch means comprising a plurality of switches connected with said rectifying means with said switches being actuable for controlling the conduction of said rectifying means to provide said plurality of pulses varying in width.

58. The system of claim 57 with said switches being unidirectional controlled conduction devices.

59. The system of claim 57 with said switches being brush and ring assemblies.

60. The system of claim 55 for converting a three phase, high frequency alternating output potential from an alternator to a single phase, low frequency alternating output load with said control switch means comprising three resolver switches, with one of said resolver switches being operable with each phase, said resolver switches being operable with said rectifying means to provide said plurality of pulses and being actuable to closed and open positions in a preselected sequence, a first of said switches being actuated closed prior to the remaining two for transmitting same of said plurality of pulses from the first phase, a second of said switches being actuated closed approximately 30° after said first switch, for transmitting others of said plurality of pulses from the second phase, and a third of said switches being actuated closed approximately 60° after said first switch for transmitting still others of said plurality of pulses from the third phase, each of said switches being closed for approximately 90° whereby said first switch opens with said second and third switches closed, said second switch opens with said third closed, and said third switch opens with said first and second opened, each of said unidirectional waves comprising the composite output from said resolver switches for a period including when said first switch was actuated closed to when said third switch was actuated open, said output switching means comprising an inverter switch operable for inverting the polarity of alternate ones of said unidirectional waves, each of said resolver switches comprising a brush and resolver ring structure, said inverter switch comprising three brushes and an inverter ring structure, said resolver ring structure and said inverter ring structure being located on a common rotor and said resolver switches and said inverter switch being located on a common stator, reducer means connecting said common rotor with the alternator whereby said rotor is rotated at a preselected speed less than the alternator speed such that the frequency of the resultant alternating output from said inverting means is 60Hz, said resolver ring structure comprising a pair of diametrically opposed resolver insulating portions extending circumferentially for approximately 90° and being spaced apart by a pair of diametrically opposed resolver conductive portions with each said resolver brush adapted to engage said resolver insulating and conductive portions, each said resolver brush being located 30° electrically from an adjacent said resolver brush, said inverter ring structure comprising a 360° continuous conductive portion electrically connected to a first less than 180° conductive portion and a second less than 180° conductive portion circumferentially in line with and extending equally circumferentially with said first conductive portion, a pair of inverter insulating portions located between said first and second conductive portions and extending circumferentially slightly greater than the width of associated ones of said inverter brushes whereby said first and second conductive portions extend circumferentially substantially further than said inverter insulating portions, two of said inverter brushes spaced 180° apart for sequential engagement with said first and second conductive portions and said inverter insulating portions and a third of said inverter brushes located for engagement with said 360° continuous conductive portions, said second less than 180° conductive portion being electrically connected with said resolver conductive portions, said brush for said third resolver switch adapted to engage said resolver insulating portions and open the circuit therethrough prior to said two of said inverter brushes engaging said inverter insulating portions and opening the circuit therethrough.

61. The system of claim 55 with said control switch means comprising a plurality of resolver switches each being operable with one phase of the high frequency output at said rectifying means, said resolver switches being operable with said rectifying means to provide said plurality of pulses and being actuable to closed and open positions in a preselected sequence, a first of said switches being actuated closed prior to the other for transmitting some of said plurality of pulses from said rectifying means, a second of said switches being actuated closed approximately a first preselected time after said first switch and while said first switch is closed whereby said first and second switches transmit others of said plurality of pulses, said first switch opening with said second switch closed and said second switch opening subsequently to the opening of said first switch, each of said unidirectional pulses comprising the composite output from said resolver switches for a period including when said first switch was actuated closed to when said second switch was actuated open, said output switching means comprising an inverter switch operable for inverting the polarity of alternate ones of said unidirectional waves, each of said resolver switches comprising a brush and resolver ring structure, said inverter switch comprising three brushes and an inverter ring structure, said resolver ring structure and said inverter ring structure being located on rotor and said resolver switches and said inverter switch being located on a stator, reducer means connecting said rotor with the alternator whereby said rotor is rotated at a preselected speed less than the alternator speed such that the frequency of the resultant alternating output from said inverting means is 60Hz, said resolver ring structure comprising a pair of diametrically opposed resolver insulating portions extending circumferentially and being spaced apart by a pair of diametrically opposed resolver conductive portions with each said resolver brush adapted to engage said resolver insulating and conductive portions, ring structure comprising a 360° continuous conductive portion electrically connected to a first less than 180° conductive portion and a second less than 180° conductive portion circumferentially in line with and extending equally circumferentially with said first conductive portion, a pair of inverter insulating portions located between said first and second conductive portions and extending circumferentially slightly greater than the width of associated ones of said inverter brushes whereby said first and second conductive portions extend circumferentially substantially further than said inverter insulating portions, two of said inverter brushes spaced apart for sequential engagement with said first and second conductive portions and said inverter insulating portions and a third of said inverter brushes located for engagement with said 360° continuous conductive portions, said second less than 180° conductive portion being electrically connected with said resolver conductive portions.

* * * * *